United States Patent
Hashimoto

(10) Patent No.: US 12,265,015 B2
(45) Date of Patent: Apr. 1, 2025

(54) METHOD FOR OPTIMIZING MICROPARTICLE SUCTION CONDITIONS, MICROPARTICLE SORTING DEVICE, MICROPARTICLE SORTING SYSTEM, AND MICROPARTICLE SORTING PROGRAM

(71) Applicant: Sony Corporation, Tokyo (JP)

(72) Inventor: Gakuji Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1020 days.

(21) Appl. No.: 16/976,060

(22) PCT Filed: Jan. 28, 2019

(86) PCT No.: PCT/JP2019/002659
§ 371 (c)(1),
(2) Date: Aug. 26, 2020

(87) PCT Pub. No.: WO2019/167510
PCT Pub. Date: Sep. 6, 2019

(65) Prior Publication Data
US 2021/0372917 A1    Dec. 2, 2021

(30) Foreign Application Priority Data
Mar. 2, 2018 (JP) ................. 2018-037468

(51) Int. Cl.
G01N 15/14    (2024.01)
G01N 15/10    (2024.01)
(Continued)

(52) U.S. Cl.
CPC ..... *G01N 15/1484* (2013.01); *G01N 15/1404* (2013.01); *G01N 15/1459* (2013.01);
(Continued)

(58) Field of Classification Search
CPC ................. G01N 2015/1486; G01N 2015/149
See application file for complete search history.

(56) References Cited

U.S. PATENT DOCUMENTS 10,752,941 B2 *   8/2020   Shirai .................. C12Q 1/6837
2003/0196714 A1  10/2003   Gilbert et al.
(Continued)

FOREIGN PATENT DOCUMENTS

CA    2264389 A    3/1998
CN    1438911 A    8/2003
(Continued)

OTHER PUBLICATIONS

International Search Report and English translation thereof mailed May 7, 2019 in connection with International Application No. PCT/JP2019/002659.
(Continued)

*Primary Examiner* — Judy Nguyen
*Assistant Examiner* — James Split
(74) *Attorney, Agent, or Firm* — Wolf, Greenfield & Sacks, P.C.

(57) ABSTRACT

The present technology is to provide a technique for further optimizing microparticle suction conditions, using a microparticle sorting microchip.
The present technology provides a method for optimizing microparticle suction conditions, using a microparticle sorting microchip including: a main flow channel in which a sheath solution and a microparticle-containing sample solution flow; and a pressure chamber that sucks microparticles. The method includes: the step of acquiring data of a velocity V of each microparticle, by introducing the sheath solution and the microparticle-containing sample solution into the main flow channel, and detecting the point of time at which the microparticle passes through a predetermined position in
(Continued)

the main flow channel; and the step of controlling the pressure for sucking the microparticles, on the basis of the data of the velocity V of each microparticle.

3 Claims, 10 Drawing Sheets

(51) Int. Cl.
*G01N 15/1404* (2024.01)
*G01N 15/149* (2024.01)

(52) U.S. Cl.
CPC ............... *G01N 2015/1006* (2013.01); *G01N 2015/1486* (2013.01); *G01N 15/149* (2024.01)

(56) References Cited

U.S. PATENT DOCUMENTS

| | | | |
|---|---|---|---|
| 2003/0198523 | A1 | 10/2003 | Bohm et al. |
| 2003/0234210 | A1 | 12/2003 | Deshpande et al. |
| 2005/0092658 | A1 | 5/2005 | Bohm et al. |
| 2012/0078531 | A1 | 3/2012 | Lo et al. |
| 2012/0298511 | A1 | 11/2012 | Yamamoto |
| 2013/0083315 | A1 | 4/2013 | Lo et al. |
| 2014/0299522 | A1 | 10/2014 | Ito |
| 2015/0049333 | A1* | 2/2015 | Gourley ................ G01N 21/47 356/338 |
| 2015/0211979 | A1 | 7/2015 | Lo et al. |
| 2016/0003729 | A1 | 1/2016 | Lo et al. |
| 2018/0126421 | A1 | 5/2018 | Ito |
| 2018/0156711 | A1* | 6/2018 | Vrane ................ G01N 15/1434 |
| 2018/0202916 | A1 | 7/2018 | Lo et al. |
| 2019/0346360 | A1* | 11/2019 | Jutte ................ G01N 15/0205 |
| 2020/0330989 | A1* | 10/2020 | Masuhara ......... B01L 3/502753 |

FOREIGN PATENT DOCUMENTS

| | | |
|---|---|---|
| CN | 101644703 A | 2/2010 |
| CN | 102753955 A | 10/2012 |
| CN | 104096687 A | 10/2014 |
| CN | 104549584 A | 4/2015 |
| CN | 105008895 A | 10/2015 |
| CN | 106716108 A | 5/2017 |
| EP | 2508253 A1 | 10/2012 |
| JP | 2005-524831 A | 8/2005 |
| JP | 2011145185 A | 7/2011 |
| JP | 2012-127922 A | 7/2012 |
| JP | 2014-036604 A | 2/2014 |
| JP | 2014-202573 A | 10/2014 |
| KR | 100670590 B1 | 1/2007 |
| KR | 20160064768 A | 6/2016 |
| WO | WO 2003/089157 A1 | 10/2003 |
| WO | WO 2003/089158 A1 | 10/2003 |
| WO | WO 2010/104993 A2 | 9/2010 |
| WO | WO 2011/067961 A1 | 6/2011 |
| WO | WO 2014/031900 A1 | 2/2014 |

OTHER PUBLICATIONS

International Written Opinion and English translation thereof mailed May 7, 2019 in connection with International Application No. PCT/JP2019/002659.
International Preliminary Report on Patentability and English translation thereof mailed Sep. 17, 2020 in connection with International Application No. PCT/JP2019/002659.
English translation of the Chinese Office Action issued Jun. 1, 2023 in Chinese Application No. CN201980015251.8.
Jingmeng et al., Simulation of a Single Cell Flow Formation Based on Hydrodynamic Focusing in Microfluidic Chips. Micronanoelectronic Technology, vol. 54, No. 3, Mar. 15, 2017:168-172.
Johann et al., A simple mechanism for reliable particle sorting in a microdevice with combined electroosmotic and pressure-driven flow. Electrophoresis. Nov. 2004;25(21-22):3720- 9.
Zhou et al., Study on Parameter Adjustment of Flow Cytometrer in Cell Sorting Experiment. Medical Equipment, No. 7, Apr. 2016; 58-60.
Zhu et al., Thermal Engineering Fundamentals. Wuhan University of Technology Press. 2014. 4 pages.

\* cited by examiner

METHOD FOR OPTIMIZING MICROPARTICLE SUCTION CONDITIONS, MICROPARTICLE SORTING DEVICE, MICROPARTICLE SORTING SYSTEM, AND MICROPARTICLE SORTING PROGRAM

CROSS-REFERENCE TO RELATED APPLICATIONS

This application claims the benefit under 35 U.S.C. § 371 as a U.S. National Stage Entry of International Application No. PCT/JP2019/002659, filed in the Japanese Patent Office as a Receiving Office on Jan. 28, 2019, which claims priority to Japanese Patent Application Number JP2018-037468, filed in the Japanese Patent Office on Mar. 2, 2018, each of which is hereby incorporated by reference in its entirety.

TECHNICAL FIELD

The present technology relates to a method for optimizing microparticle suction conditions, a microparticle sorting device, a microparticle sorting system, and a microparticle sorting program. More specifically, the present technology relates to a method for optimizing microparticle suction conditions, a microparticle sorting device, a microparticle sorting system, and a microparticle sorting program in the technology for sorting the target microparticles in a microchip with a closed system without forming droplets in a microparticle sorter to be used in a flow cytometer.

BACKGROUND ART

To this date, various devices have been developed to sort out microparticles. For example, in a microparticle sorter that is used in a flow cytometer, a laminar flow formed with a sample solution containing cells and a sheath solution is ejected from an orifice formed in a flow cell or a microchip. When the laminar flow is ejected, a predetermined vibration is applied to the laminar flow, so that droplets are formed. The moving direction of the formed droplets is electrically controlled depending on whether or not the target microparticles are contained, and thus, the target microparticles are sorted out.

There also are techniques developed for sorting out the target microparticles in a microchip, without forming droplets as described above.

For example, Patent Document 1 shown below discloses "a microchip that includes: a sample solution introducing channel in which a sample solution containing microparticles flows; at least one pair of sheath solution introducing channels that join the sample solution introducing channel from both sides, and introduce a sheath solution to the periphery of the sample solution; a merging channel that communicates with the sample solution introducing channel and the sheath solution introducing channel, the solutions flowing in these flow channels merging with each other and flowing in the merging channel; a negative-pressure suction unit that communicates with the merging channel, and sucks and attracts the microparticles to be collected; and at least one pair of waste flow channels that are disposed on both sides of the negative-pressure suction unit, and communicate with the merging channel". In the microchip, the target microparticles are sucked and collected into the negative-pressure suction unit.

Further, Patent Document 2 shown below discloses "a microparticle sorting method that includes a procedure for collecting microparticles existing in a solution flowing in a main flow channel into a branch flow channel by generating a negative pressure in the branch flow channel communicating with the main flow channel, the procedure including formation of a solution flow from the branch flow channel side toward the main flow channel side, the solution flow being formed at the communicating port between the main flow channel and the branch flow channel". In the sorting method, the solution flow toward the main flow channel side prevents non-target particles or a sample solution and a sheath solution containing the non-target particles from entering the sorting flow channel during a non-sorting operation. Patent Document 2 shown below also discloses a microparticle sorting microchip capable of implementing the microparticle sorting method.

As described above, according to a technique for collecting target microparticles in a microchip, in a case where the solution flowing in the main flow channel does not contain the target microparticles, the solution flows into a waste flow channel, for example. In a case where the solution flowing in the main flow channel contains the target microparticles, the solution is guided into the particle sorting channel. Thus, the target microparticles are collected.

CITATION LIST

Patent Documents

Patent Document 1: Japanese Patent Application Laid-Open No. 2012-127922

Patent Document 2: Japanese Patent Application Laid-Open No. 2014-36604

SUMMARY OF THE INVENTION

Problems to be Solved by the Invention

In a closed-system technique for sorting out target microparticles in a microchip, the target microparticles can be sucked into the particle sorting channel by a negative pressure, for example. In a case where the solution does not contain the target microparticles, suctioning is not performed. Therefore, to enhance microparticle sorting performance, it is necessary to optimize the timing at which suctioning is performed and/or the magnitude of the suction force to be used.

In view of this, to enhance microparticle sorting performance in the techniques for sorting out target microparticles, development has been made to optimize the timing at which suctioning is performed and/or the magnitude of the suction force to be used (Japanese Patent Application No. 2017-102694).

The technique for optimizing microparticle suction conditions according to Japanese Patent Application No. 2017-102694 is a technique that includes:

a process of detecting a microparticle passing through a predetermined position in a main flow channel in which a solution containing microparticles flows, sucking the microparticles from the main flow channel into a microparticle suction channel with a predetermined suction force of the microparticle suction channel, and counting the number of the microparticles sucked into the microparticle suction channel; and a process of determining the time elapsed since the passage through the predetermined time, on the basis of the time from the point of time at which the microparticle passed through the predetermined position in the main flow channel till the suctioning is performed, and the number of the counted microparticles, the suctioning by the microparticle suction channel being to be performed after the elapsed time.

However, there is a demand for further development of the technology, and further enhancement of microparticle sorting performance.

Solutions to Problems

As a result of intensive studies, the present inventor has found that the above problems can be solved by the techniques described below.

Specifically, the present technology provides a method for optimizing microparticle suction conditions, using a microparticle sorting microchip including: a main flow channel in which a sheath solution and a microparticle-containing sample solution flow; and a pressure chamber that sucks microparticles, the method including:

the step of acquiring data of a velocity V of each microparticle, by introducing the sheath solution and the microparticle-containing sample solution into the main flow channel, and detecting the point of time at which the microparticle passes through a predetermined position in the main flow channel; and the step of controlling the pressure for sucking the microparticles, on the basis of the data of the velocity V of each microparticle.

The method may further include the step of acquiring data of at least one of the average velocity $V_{ave}$ of the microparticles during a certain time, or the maximum velocity $V_{max}$ or the minimum velocity $V_{min}$ among the respective microparticles.

The method may also include the step of controlling the pressure for sucking the microparticles, on the basis of the data of at least one of the average velocity $V_{ave}$ of the microparticles during the certain time, or the maximum velocity $V_{max}$ or the minimum velocity $V_{min}$ among the respective microparticles, and the data of the velocity V of each microparticle.

The method may further include the step of controlling the pressure for sucking the microparticles, in inverse proportion to an index calculated by $V/V_{ave}$.

Here, the average velocity $V_{ave}$ can be calculated, on the basis of a Hagen-Poiseuille distribution of the velocities of the microparticles during the certain time.

Alternatively, the method may further include the step of controlling the pressure for sucking the microparticles, in inverse proportion to an index calculated by $V/V_{max}$.

Also, the data of the velocity V of each microparticle may be acquired, on the basis of a time t in which a microparticle travels from the predetermined position in the main flow channel to the sorting position.

In the step of controlling the pressure for sucking the microparticles, the pressure may be generated by driving of an actuator.

Also, when the microparticles flow through a substantially central portion of the microparticle-containing sample solution, the pressure in the pressure chamber with the maximum velocity $V_{max}$ among the respective microparticles at the time t may be higher than the pressure with the average velocity $V_{ave}$.

Alternatively, when the microparticles pass through a substantially outermost portion of the microparticle-containing sample solution, the pressure in the pressure chamber with the minimum velocity $V_{min}$ among the respective microparticles at the time t may be lower than the pressure with the average velocity $V_{ave}$.

The microparticles may be microbeads detectable by light irradiation. Note that the microbeads can be used as the adjustment microparticles described below.

Alternatively, cells, microorganisms, biological microparticles such as liposomes, or the like can be used as the microparticles in the present technology.

The present technology also provides a method for optimizing microparticle suction conditions, the method using a microparticle sorting microchip including: a main flow channel in which a sheath solution and a microparticle-containing sample solution flow; and a pressure chamber that sucks microparticles, the method including:

the step of acquiring data of a velocity V of each adjustment microparticle, by introducing the sheath solution and an adjustment-microparticle-containing sample solution into the main flow channel, and detecting a point of time at which the adjustment microparticle passes through a predetermined position in the main flow channel;

the step of sucking the adjustment microparticles from the main flow channel into the pressure chamber with a predetermined suction force;

the step of counting the number of the adjustment microparticles sucked into the pressure chamber;

the step of determining a time elapsed since passage through the predetermined position, on the basis of a time from the point of time at which the adjustment microparticle passed through the predetermined position in the main flow channel till the suctioning is performed, and the number of the counted adjustment microparticles, the suctioning being to be performed after the elapsed time;

the step of acquiring data of a velocity V of each adjustment microparticle, and an average velocity $V_{ave}$ during a certain time, by introducing a larger amount of sample solution than the adjustment-microparticle-containing sample solution into the main flow channel, and detecting a point of time at which the adjustment microparticle passes through the predetermined position in the main flow channel; and the step of sorting the adjustment microparticles into the pressure chamber, by controlling the pressure in the pressure chamber sucking the adjustment microparticles, in inverse proportion to an index calculated by $V/V_{ave}$.

The present technology may include the step of counting the number of the adjustment microparticles sucked into the pressure chamber, after the step of sorting the adjustment microparticles into the pressure chamber, in which the number of times the adjustment microparticles have been sorted into the pressure chamber is compared with the particle count number of the sorted-out adjustment microparticles, and, when it is determined that not all the adjustment microparticles have been sorted, the pressure in the pressure chamber is made higher and/or smaller, to calculate a constant with which the particle count number of the sorted-out adjustment microparticles becomes substantially the same as the total number of the introduced adjustment microparticles.

The present technology further provides a microparticle sorting device including:

a microparticle sorting microchip including: a main flow channel in which a sheath solution and a microparticle-containing sample solution flow; and a pressure chamber that sucks microparticles;

a velocity data acquisition unit that acquires data of a velocity V of each microparticle, by introducing the sheath solution and the microparticle-containing sample solution into the main flow channel, and detecting a point of time at which the microparticle passes through a predetermined position in the main flow channel; and a pressure control unit that controls a pressure for sucking the microparticles, on the basis of the data of the velocity V of each microparticle.

The present technology yet further provides a microparticle sorting system including:

a microparticle sorting microchip including: a main flow channel in which a sheath solution and a microparticle-containing sample solution flow; and a pressure chamber that sucks microparticles;

a velocity data acquisition device that acquires data of a velocity V of each microparticle, by introducing the sheath solution and the microparticle-containing sample solution into the main flow channel, and detecting a point of time at which the microparticle passes through a predetermined position in the main flow channel;

a pressure control device that controls a pressure for sucking the microparticles, on the basis of the data of the velocity V of each microparticle; and a computer in which a program for controlling the pressure is installed.

The present technology also provides a microparticle sorting program using a microparticle sorting microchip including: a main flow channel in which a sheath solution and a microparticle-containing sample solution flow; and a pressure chamber that sucks microparticles, the microparticle sorting program causing a computer to:

acquire data of a velocity V of each microparticle by introducing the sheath solution and the microparticle-containing sample solution into the main flow channel, and detecting a point of time at which the microparticle passes through a predetermined position in the main flow channel, and data of an average velocity $V_{ave}$ of the microparticles during a certain time; and control a suction force of the pressure chamber, in inverse proportion to an index calculated by $V/V_{ave}$.

Alternatively, the present technology provides a microparticle sorting program using a microparticle sorting microchip including: a main flow channel in which a sheath solution and a microparticle-containing sample solution flow; and a pressure chamber that sucks microparticles, the microparticle sorting program causing a computer to:

acquire data of an adjustment microparticle velocity, by introducing the sheath solution and an adjustment-microparticle-containing sample solution into the main flow channel, and detecting a point of time at which the adjustment microparticle passes through a predetermined position in the main flow channel;

suck the adjustment microparticles from the main flow channel into the pressure chamber with a predetermined suction force generated from the pressure chamber;

count the number of the adjustment microparticles sucked into the pressure chamber;

determine a time elapsed since passage through the predetermined position, on the basis of the time from the point of time at which the adjustment microparticle passed through the predetermined position in the main flow channel till the suctioning is performed, and the number of the counted adjustment microparticles, the suctioning being to be performed after the elapsed time;

acquire data of a velocity V of each adjustment microparticle, and the average velocity $V_{ave}$ of the adjustment microparticles during a certain time, by introducing a larger amount of sample solution than the adjustment-microparticle-containing sample solution into the main flow channel, and detecting a point of time at which the adjustment microparticle passes through the predetermined position in the main flow channel; and sort the adjustment microparticles into the pressure chamber, by controlling the suction force of the pressure chamber, in inverse proportion to an index calculated by $V/V_{ave}$.

Effects of the Invention

According to the present technology, the timing at which suctioning is performed and/or the magnitude of the suction force to be used is further optimized in a closed-system technology for sorting the target microparticles. As a result, microparticle sorting performance is further enhanced.

Note that the effects to be achieved by the present technology are not limited to the effect described herein, and may include any of the effects described in the present disclosure.

MODES FOR CARRYING OUT THE INVENTION

The following is a description of preferred embodiments for carrying out the present technology. Note that the embodiments described below are typical embodiments of the present technology, and do not narrow the interpretation of the scope of the present technology. Note that explanation will be made in the following order.

1. Description of related technology
1-1. Microparticle sorting microchip
1-2. Microparticle sorting device
1-3. Operating principles for sorting microparticles
2. Method for optimizing microparticle suction conditions
2-1. Basic suction condition optimization method I
2-2. Basic suction condition optimization method II
2-3. Phenomena during microparticle suctioning
2-4. Suction condition optimization method corresponding to the size of a sample core
3. Embodiments of microparticle suction control
3-1. Embodiment I
3-2. Embodiment II
4. Microparticle sorting program
5. Microparticle sorting system

1. Description of Related Technology

1-1. Microparticle Sorting Microchip

Figure 1:
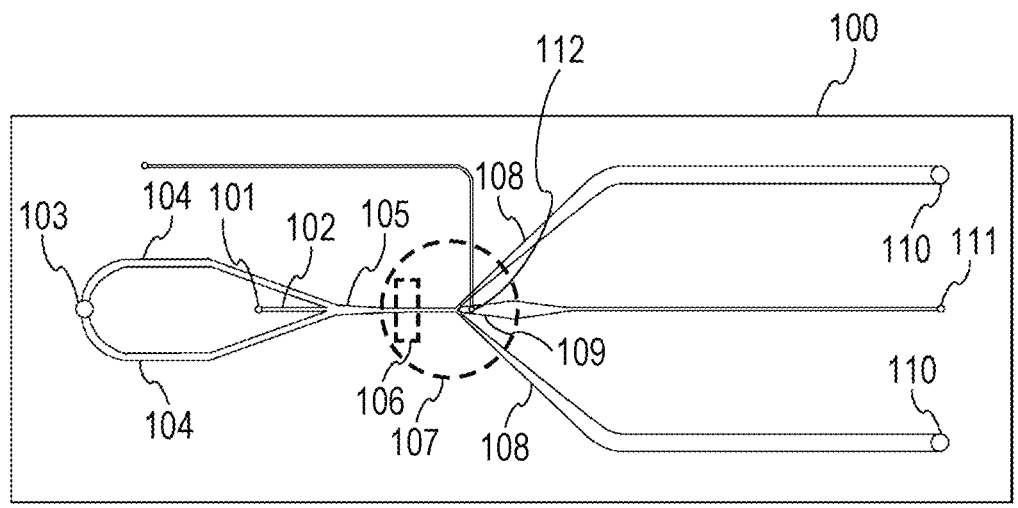
FIG. 1 is a schematic diagram of a microchip to be used in a technique for sorting microparticles.

A technique for sorting target microparticles is described below, with reference to FIG. 1. FIG. 1 is a schematic diagram of an example microparticle sorting microchip.

As shown in FIG. 1, a microchip 100 includes a sample solution inlet 101 and a sheath solution inlet 103. From these inlets, a sample solution and a sheath solution are introduced into a sample solution channel 102 and a sheath solution channel 104, respectively. The sample solution contains microparticles.

The sheath solution flowing in the sheath solution introducing channel 104 merges with the sample solution flowing in the sample solution channel 102, to form a laminar flow in which the periphery of the sample solution is surrounded by the sheath solution. The laminar flow flows in a main flow channel 105 toward a sorting unit 107.

In the sorting unit 107, the laminar flow that has flowed through the main flow channel 105 then flows into branch flow channels 108. Further, in the sorting unit 107, only in a case where the particles to be collected have flowed thereinto, a flow to a particle sorting channel 109 is formed, and the particles are collected. When the particles are sucked into the particle sorting channel 109, the sample solution forming the laminar flow, or the sample solution and the sheath solution forming the laminar flow also flow into the particle sorting channel 109.

A gate flow inlet 112 may be provided to prevent the not-to-be-collected particles from entering the particle sorting channel 109. The sheath solution is introduced from the gate flow inlet 112, to form a flow in the direction from the particle sorting channel 109 toward the main flow channel 105. Thus, the particles that should not be collected are prevented from entering the particle sorting channel 109.

In this manner, microparticles are sorted at the sorting unit 107.

The sorting unit 107 includes a detection region 106. In the detection region 106, the microparticles flowing in the main flow channel 105 are irradiated with light, and it is determined whether or not the microparticles should be collected, depending on the scattered light and/or the fluorescence generated as a result of the irradiation.

Figure 2:
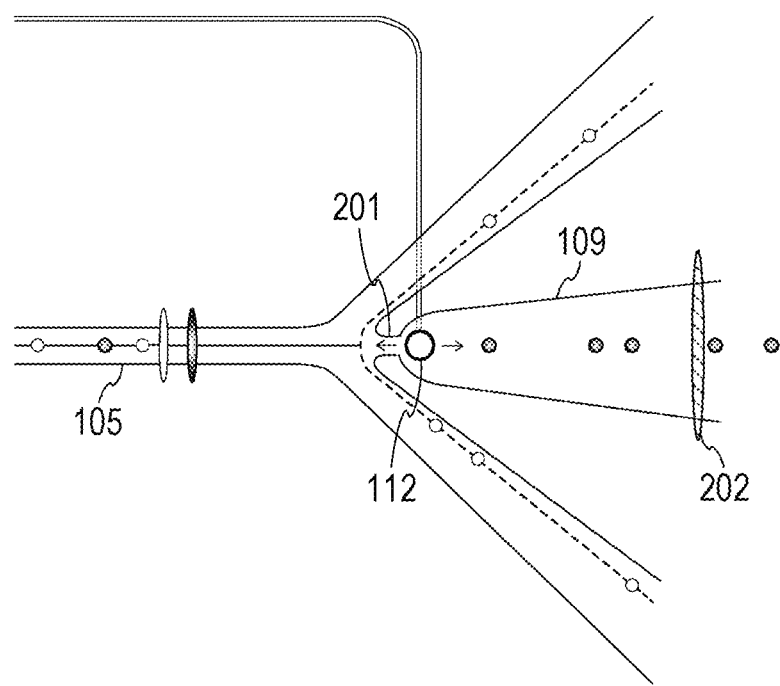
FIG. 2 is an enlarged view of the sorting unit of the microchip.

An enlarged view of the sorting unit 107 is shown in FIG. 2. As shown in FIG. 2, the main flow channel 105 and the particle sorting channel 109 communicate with each other via an orifice portion 201 that is coaxial with the main flow channel 105. The particles to be collected flow toward the particle sorting channel 109 through the orifice portion 201. The gate flow inlet 112 is also disposed near the orifice portion 201, to prevent the particles not to be collected from entering the particle sorting channel 109 through the orifice portion 201. Note that the gate flow inlet 112 may be disposed inside the orifice portion 201. The sheath solution is introduced from the gate flow inlet 112, to form a flow from the orifice portion 201 toward the main flow channel 105. Thus, the particles that should not be collected are prevented from entering the particle sorting channel 109. A pressure chamber may be connected to the particle sorting channel 109. The pressure chamber may be disposed in the particle sorting channel 109, or the particle sorting channel may function as a pressure chamber. The pressure in the pressure chamber can be reduced or increased. The pressure in the pressure chamber is reduced, so that the microparticles are guided into the particle sorting channel 109. Alternatively, the pressure in the pressure chamber is increased or maintained, so that the microparticles are prevented from entering the particle sorting channel 109. As the pressure in the pressure chamber is adjusted in this manner, it becomes possible to sort out only the particles to be collected.

In a microchip having such a flow channel structure, in a case where particles are collected, a flow from the main flow channel 105 toward the particle sorting channel 109 through the orifice portion 201 (this flow will be hereinafter also referred to as the "flow at the time of particle collection") is formed. The flow is not formed except in a case where particles are collected. The pressure in the pressure chamber is reduced so that the flow at the time of particle collection is formed. Due to the decrease in the pressure, a stronger flow than the flow from the orifice portion toward the main flow channel, which is generated by the gate flow, is formed in the direction from the main flow channel 105 toward the particle sorting channel 109. As a result, the target particles are sorted out and are guided into the particle sorting channel 109.

It is possible to form the flow at the time of particle collection by making the pressure in the particle sorting channel 109 a negative pressure. That is, as the particle sorting channel 109 is made to have a negative pressure, the particles are sucked into the particle sorting channel 109. The suctioning of the particles is performed when a predetermined time has elapsed since the time at which the particles passed through the detection region 106 in a case where it was determined that the particles should be collected on the basis of the light detected in the detection region 106. For more accurate particle sorting, it is necessary to optimize the duration of time that has passed before suctioning is performed.

Further, in a case where the particles are sucked into the particle sorting channel 109, the sample solution and/or the sheath solution is sucked, together with the particles, into the particle sorting channel 109. In a case where the applied suction force is too great, the amount of the sample solution and/or the sheath solution sucked together with the particles into the particle sorting channel 109 becomes larger, and the density of the collected particles drops, which is not desirable. In a case where the applied suction force is too small, on the other hand, the probability that particles will not be collected becomes higher. Therefore, it is desirable to optimize the suction force to be applied.

1-2. Microparticle Sorting Device

A microparticle sorting device according to the present technology implements an optimization method according to the present technology. The optimization method can be implemented in 1-1. Microparticle Sorting Microchip described above, for example. That is, the microparticle sorting device according to the present technology can include the microchip, but does not necessarily do so. Note that the microparticle sorting microchip may be easily replaceable and may be disposable.

The microparticle sorting device to be used in the present technology includes:

a velocity data acquisition unit that causes the sheath solution and the microparticle-containing sample solution to flow into the main flow channel, detects the point of time at which microparticles pass through a predetermined position in the main flow channel, and acquires data of a velocity V of each microparticle; and a pressure control unit that controls the pressure for suctioning of the microparticles, on the basis of the data of the velocity V.

The detection of the microparticles is performed in the detection region that is set in the main flow channel and the particle sorting channel of the microparticle sorting microchip. In the detection region, the microparticles sucked into the particle sorting channel are also counted.

In a specific operation of the velocity data acquisition unit, the following step (a particle number counting step) is carried out: the point of time at which the microparticles pass through a predetermined position in the main flow channel of the microparticle sorting microchip is detected, the point of time at which microparticles pass through a predetermined position in the particle sorting channel, and the number of the microparticles is mounted.

The data obtained in the particle number counting step is used in a data processing unit to determine the time elapsed since the time at which the microparticles have passed through the predetermined position. After the elapsed time, suctioning into the particle sorting channel is to be performed.

Further, the velocity data acquisition unit can also carry out a repeating step of repeating the particle number counting step, by changing the period from the time at which microparticles pass through the predetermined position in the main flow channel till suctioning into the particle sorting channel is performed.

Furthermore, the velocity data acquisition unit may further carry out a second repeating step of repeating the particle number counting step and/or the repeating step, by changing the suction force.

In the second repeating step, the suction force is gradually reduced from a suction force $D_0$ at a predetermined rate. The second repeating step is carried out until such a result is obtained that the number of sucked microparticles becomes 0 in a case with any elapsed time. In this case, in the step of determining the time elapsed since the time at which microparticles have passed through the predetermined position, the elapsed time being the time at which suctioning into the particle sorting channel is to be performed, the suction force increased at the predetermined rate from the suction force in a case where such a result is obtained that the number of sucked microparticles is 0 in a case with any elapsed time is determined, by the data processing unit, to be the suction force that is to be used in microparticle suctioning.

In the step of determining the suction force to be used in microparticle suctioning, the data processing unit calculates the rate of success in sucking microparticles into the particle sorting channel on the basis of the numbers of microparticles counted in the particle number counting step and the repeating step, as well as in the second repeating step if necessary, and determines the time elapsed since the time at which the microparticles passed through the predetermined position, after which elapsed time suctioning is to be performed, on the basis of the success rate.

The microparticle sorting device according to the present technology further includes: a light irradiation unit that irradiates microparticles flowing in the main flow channel with light; a detection unit that detects scattered light and/or fluorescence emitted from the microparticles; and a traveling direction control unit that controls the traveling direction of the microparticles flowing in the main flow channel, on the basis of the data detected by the detection unit. In the description below, the light irradiation unit, the detection unit, and the traveling direction control unit are described.

In the present technology, the light irradiation unit irradiates the microparticles flowing in the main flow channel with light (excitation light). The light irradiation unit may include a light source that emits excitation light, and an objective lens that concentrates the excitation light onto the microparticles flowing in the main flow channel. The light source can be selected from a laser diode, an SHG laser, a solid-state laser, a gas laser, a super luminosity LED, and the like as appropriate, depending on the purpose of analysis. The light irradiation unit may include other optical elements, if necessary, in addition to the light source and the objective lens.

By the method according to the present technology, the light irradiation unit may emit light onto the detection region in the main flow channel. The position onto which the light is emitted may be the light irradiation position described above with reference to FIG. 1. The light to be emitted by the light irradiation unit may be one light, or two or more lights. The light to be emitted by the light irradiation unit may be two lights having different wavelengths, or may be two lights having the same wavelength, for example. The emission of the light causes microparticles to emit scattered light and/or fluorescence. Whether or not to collect microparticles is determined depending on the emitted scattered light and/or fluorescence. Passage of microparticles at the predetermined position is also detected from the emitted scattered light and/or fluorescence.

Further, as two lights are emitted, the velocity of the microparticles in the channel is calculated from the distance between the two lights and the time required for the microparticles to travel between the two lights, for example. That is, the velocity is calculated from first and second light irradiation units and first and second detection units.

The second light irradiation unit emits light onto the detection region (106) in the microparticle suction channel described above with reference to FIG. 1. The emission of the light causes microparticles to emit scattered light and/or fluorescence. As the scattered light and/or fluorescence is detected, the number of microparticles sucked into the microparticle suction channel is counted.

Also, the microparticle sorting device to be used in the present technology may further include a dark-field illumination system for detecting sorted microparticles, and/or a camera observation system for observing the sorting unit. The microparticle sorting device to be used in the present technology may further include a transillumination system that illuminates the visual field being observed by the camera observation system.

In the present technology, the detection unit detects scattered light and/or fluorescence emitted from the microparticles due to light emission by the light irradiation unit. The detection unit may include a condenser lens that condenses fluorescence and/or scattered light generated from microparticles, and a detector. The detector may be, but is not limited to, a PMT, a photodiode, a CCD, a CMOS, or the like. The detection unit may include other optical elements, if necessary, in addition to the condenser lens and the detector.

Also, the microparticle sorting device according to the present technology may further include a second detection unit for detecting light generated by light emitted from the second light irradiation unit.

The fluorescence to be detected by the detection unit and the second detection unit may be, but is not limited to, fluorescence generated from microparticles, and fluorescence generated from the substance with which the microparticles are labeled, such as a fluorescent substance, for example. The scattered light to be detected by the detection unit and the second detection unit may be, but is not limited to, forward-scattered light, side-scattered light, Rayleigh scattering, and/or Mie scattering.

Figure 3:
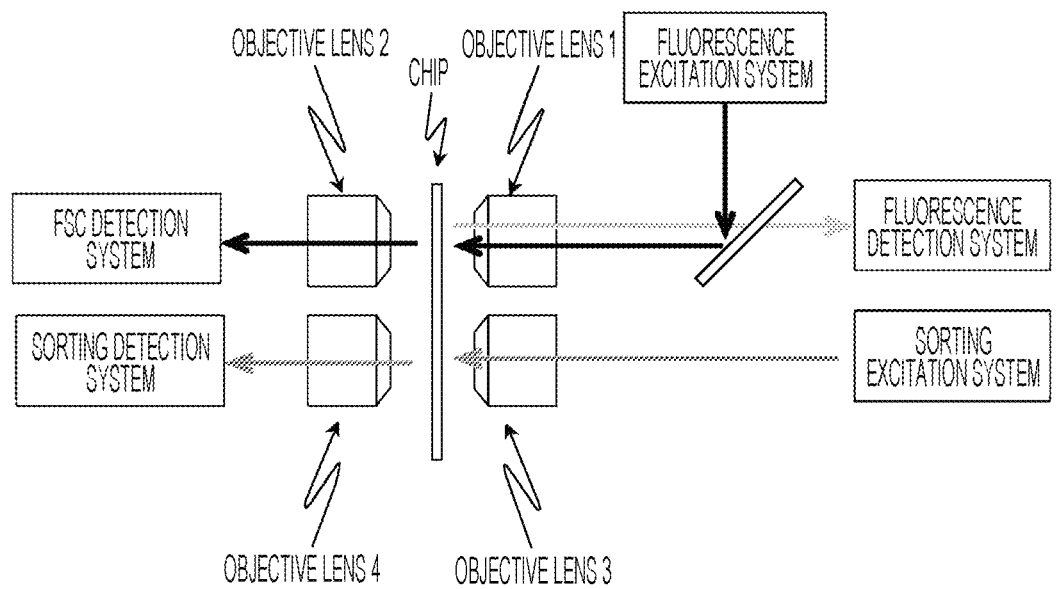
FIG. 3 is a diagram showing an optical system configuration of a microparticle sorting device.

FIG. 3 shows examples of the light irradiation unit (a fluorescence excitation system), the second light irradiation unit (a sorting excitation system), the detection unit (an FSC detection system and a fluorescence detection system), and the second detection unit (a sorting detection system) that are used in the present technology The light irradiation unit emits light for fluorescence excitation onto the microparticles flowing in the microchip. The second light irradiation unit emits light for detecting microparticles sorted out and guided into the microparticle sorting channel.

The detection unit includes a forward-scattered light detection system and a fluorescence detection system. These detection systems detect the light generated by emission of light from the light irradiation unit to microparticles. On the basis of the detected light, the traveling direction control unit described below determines whether or not microparticles should be sorted. Also, on the basis of the detected light, the control unit described above detects passage of microparticles at the predetermined position. Further, on the basis of the detected light, the control unit described above calculates the velocity of the passing microparticles.

The second detection unit detects the light generated by emission of light from the second light irradiation unit to microparticles. Through the light detection, the microparticles sucked into the microparticle suction channel are detected. The light detected by the second detection unit is preferably forward-scattered light, and the forward-scattered light may preferably not depend on a fluorescent marker.

As shown in FIG. 3, emission of light from the light irradiation unit to the microchip is performed through an objective lens. The numerical aperture (NA) of the objective lens is preferably 0.1 to 1.5, or more preferably 0.5 to 1.0. More preferably, the numerical aperture may be 0.7.

Further, the forward-scattered light generated by the emission of the light by the light irradiation unit is detected by the forward-scattered light detection system, after passing through an objective lens. The numerical aperture (NA) of the objective lens may be preferably 0.05 to 1.0, more preferably 0.1 to 0.5, or even more preferably 0.3.

Further, the fields of view of these objective lenses may include the light irradiation position, or preferably include both the light irradiation position and the branch portions.

As such optical systems are provided, it is possible to perform signal detection using the above mentioned two different wavelengths, and detect the velocity of the passing particles from the distance and the signal detection time difference.

Figure 4:
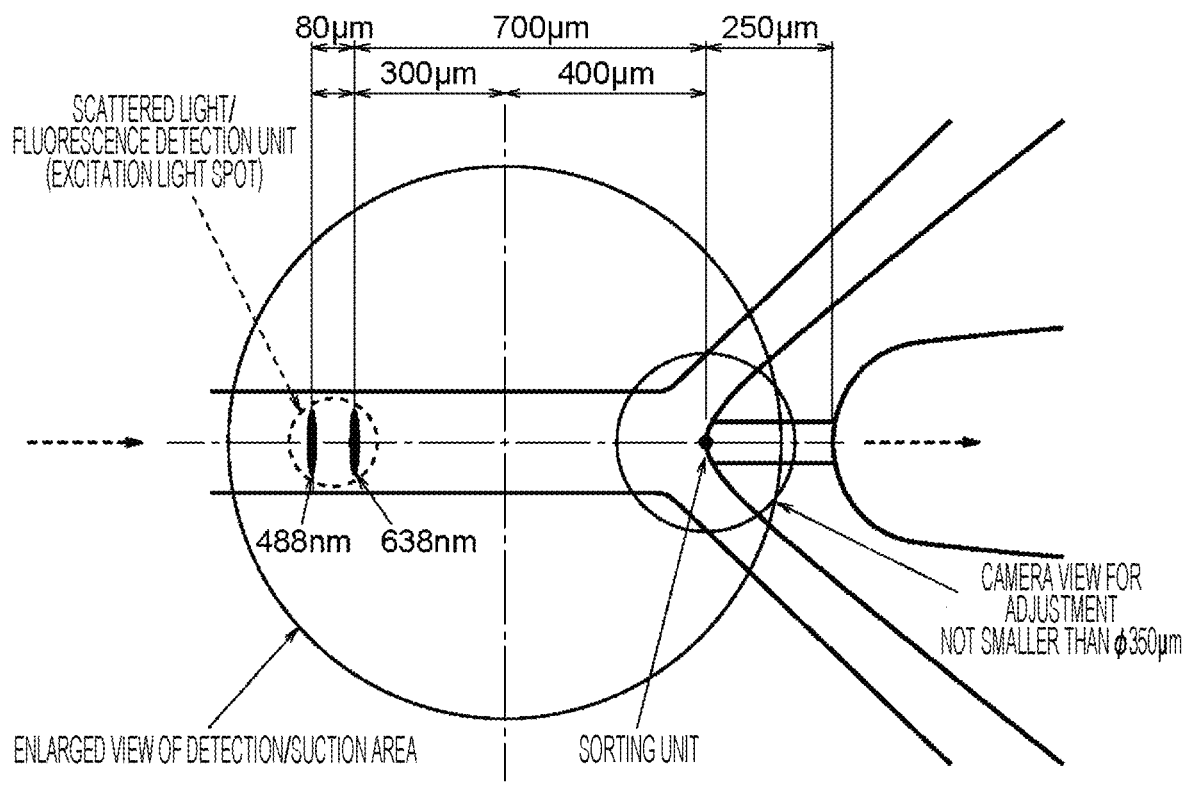
FIG. 4 is a diagram showing an optical system configuration of a microparticle sorting device.

FIG. 4 shows an example of the optical system configuration from the main flow channel to the sorting unit of the microparticle sorting microchip.

The first light irradiation unit emits light of 488 nm, and the second light irradiation unit emits light of 638 nm. The distance between the first and second detectors corresponding to them is 80 μm. After signal detection by the first detection unit, microparticles flow between them, and signal detection is performed by the second detection unit. This enables calculation the velocity at which the microparticles flow.

Further, the portion 700 μm ahead of the second detection unit is set as the sorting unit, and the adjustment camera observation visual field of Φ350 nm around the sorting unit is set, so that the microparticles that have passed through the sorting unit can be observed.

Note that, when the sorted-out microparticles are detected after sorting of microparticles, an optical system that detects forward scattering that does not depend on the fluorescent marker is preferable.

In the microparticle sorting device to be used in the present technology, the traveling direction control unit controls whether or not to cause the microparticles flowing in the main flow channel to travel into the branch flow channels, or whether or not to suck the microparticles into the particle sorting channel, on the basis of the data detected by the detection unit. The fluorescence and scattered light detected by the detection unit are converted into an electric signal. That is, the microparticle sorting device according to the present technology includes an electric signal conversion unit. The electric signal conversion unit may be included in the traveling direction control unit, or may not be included in the traveling direction control unit. The traveling direction control unit receives the electric signal, and determines the optical characteristics of the microparticles on the basis of the electric signal. In a case where the microparticles should be collected on the basis of the result of the determination, the traveling direction control unit can change the flow in the flow channel so that the microparticles travel in the microparticle sorting channel through the orifice portion. To change the flow, the pressure in the pressure chamber is reduced, for example. Further, after the collection of the microparticles, the traveling direction control unit can again change the flow in the flow channel. To change the flow again, the pressure in the pressure chamber is increased. That is, the traveling direction control unit controls the pressure in the pressure chamber communicating with the orifice portion, on the basis of the data detected by the detection unit. The traveling direction control unit may also control the flow of a solution, such as a gate flow, in the flow channel provided for forming a flow of a solution from the orifice portion toward the main flow channel, for example. The traveling direction control unit may have functions similar to those of the drive unit disclosed in Japanese Patent Application Laid-Open No. 2014-036604.

1-3. Operating Principles for Sorting Microparticles

Figure 5:
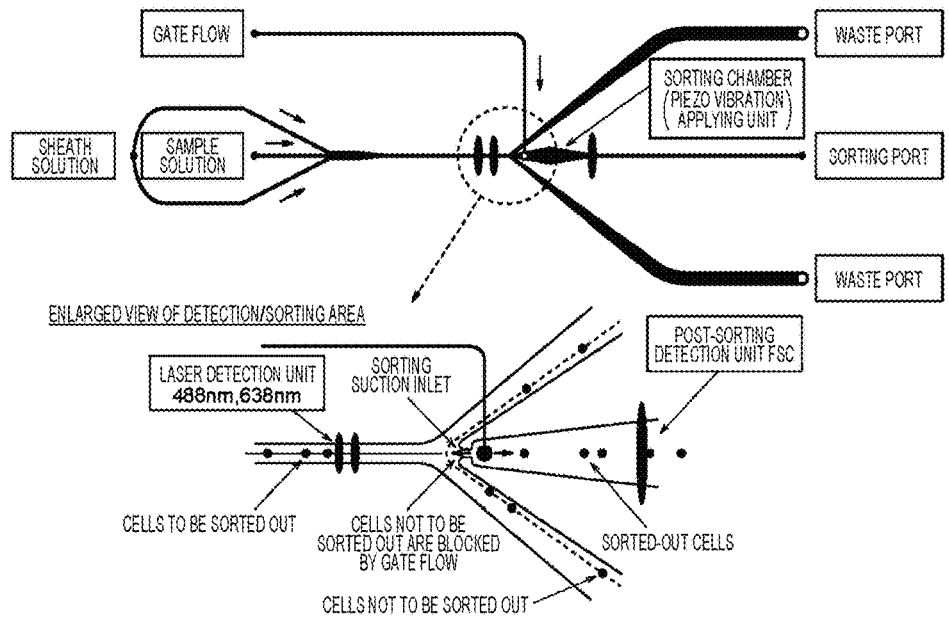
FIG. 5 is a diagram showing the operating principles for sorting microparticles.

FIG. 5 shows the operating principles for sorting microparticles in the present technology.

The microparticle-containing sample solution flows as a sample solution in the direction of an arrow in FIG. 5 from the inlet portion of the microparticle sorting microchip. However, to accurately read information about the scattered light and/or fluorescence generated as a result of emission of light onto the microparticles flowing in the main flow channel, it is necessary to cause the microparticles to pass through the focal position of light irradiation one by one with precision. Therefore, as described above, it is necessary to cause the sheath solution to flow to wrap the flow of the microparticle-containing sample solution, and create a flow in which the microparticle-containing sample solution is the center (the flow in the central portion will be hereinafter also referred to as the "sample core").

In the sorting unit, which is the region for performing a sorting operation, the flow channel is divided into three branches: one particle sorting channel and two waste flow channels. To prevent microparticles from entering from the gate flow, a minute flow as indicated by the arrow shown at the sorting suction inlet in FIG. 5 is generated, so that all the microparticles are separated into the two waste flow channels and are discarded in a case where any sorting operation is not performed.

As for the microparticles determined to be sorted out in accordance with the information about the scattered light and/or fluorescence, on the other hand, the pressure chamber is quickly deformed by an actuator, to generate a minute negative pressure. A suctioning operation is then performed at the sorting unit (the triply branching point), to introduce the microparticles into the particle sorting channel.

Since the degree of influence on the amount of deformation of the suction chamber and the change in the flow in the flow channel is low, a high-speed operation is possible when the amount (volume) of suction for sorting is small, and thus, a high throughput can be achieved in the sorting process. However, if the amount of suction is too small, the gate flow, which is responsible for preventing mixing, cannot be surpassed, the microparticles to be sorted out cannot be sucked, and the sorting operation cannot be completed.

Therefore, to achieve robust sorting performance while maintaining a high throughput in the sorting process, it is necessary to accurately detect the velocity (V) of each flowing microparticle, and perform a sorting operation at the optimum timing (T) and with the optimum suction amount (D) for each cell.

2. Method for Optimizing Microparticle Suction Conditions 2-1. Basic Suction Condition Optimization Method I To optimize the above suction timing and/or suction force, the technique for optimizing the microparticle suction conditions disclosed in Japanese Patent Application No. 2017-102694 was developed. The outline of the technology will be described below, but the technology is described in greater detail in the specification of Japanese Patent Application No. 2017-102694.

Figure 6:
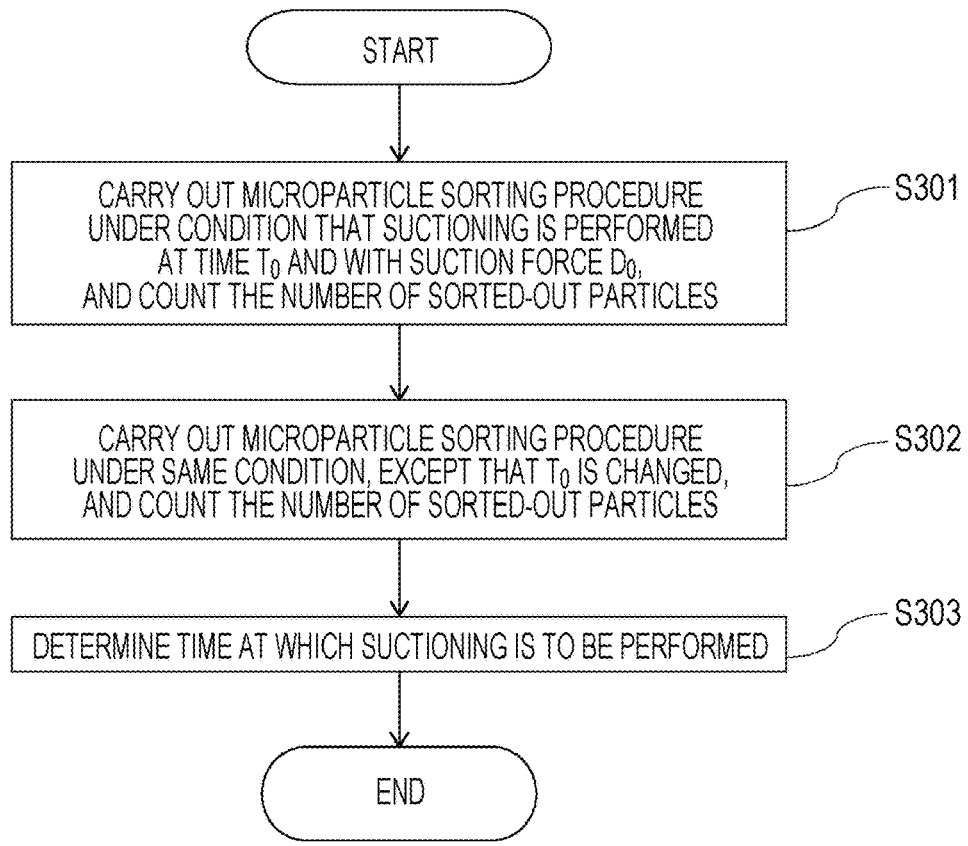
FIG. 6 is a flowchart of a method for optimizing the microparticle suction conditions.

An example embodiment of the above method is described below, with reference to FIG. 6. FIG. 6 shows a flowchart of a basic suction condition optimization method.

(1) Particle Number Counting Step S301

Particle number counting step S301 in FIG. 6 is carried out under the condition that suctioning by the microparticle suction channel is performed with the predetermined suction force $D_0$ at the point of time when the predetermined time $T_0$ has elapsed since the microparticles passed through the predetermined position in the main flow channel. A microparticle sorting procedure is carried out in the microchip under the conditions, and the number of the microparticles sucked into the microparticle suction channel as a result of the sorting procedure is counted.

In the particle number counting step S301, the point of time at which the microparticles pass through the predetermined position in the main flow channel in which the solution containing the microparticles flows is detected. The predetermined position in the main flow channel is only required to be a position at which passage of microparticles can be detected. The predetermined position may be located in the detection region in the main flow channel, for example, and is the light irradiation position, for example.

Figure 7:
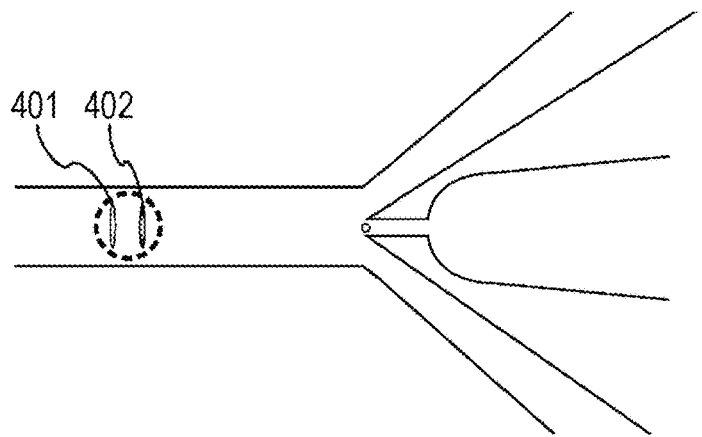
FIG. 7 is a diagram showing a position at which passage of microparticles is detected.

The predetermined position in the main flow channel is now described with reference to FIG. 7. FIG. 7 is an enlarged view of the sorting unit 107. As shown in FIG. 7, the detection region is irradiated with two lights 401 and 402, for example, perpendicularly to the traveling direction of the particles. The irradiation interval of the two lights 401 and 402 is 20 to 200 μm, preferably 30 to 150 μm, or more preferably 40 to 120 μm, for example. The wavelengths of these two lights may be different, or may be the same. Between the two lights, the predetermined position may be the irradiation position of the light 402 on the side of the microparticle suction channel, or may be the irradiation position of the other light 401, for example. When microparticles pass through a portion irradiated with light, scattered light and/or fluorescence is generated. Thus, the passage of the microparticles is detected.

In the particle number counting step S301, the microparticles are sucked from the main flow channel into the microparticle suction channel by a predetermined suction force of the microparticle suction channel. The suctioning is performed when the predetermined time $T_0$ has elapsed since the microparticles passed through the predetermined position. The predetermined time $T_0$ after the microparticles pass through the predetermined position may be set by those skilled in the art as appropriate, and can be determined with the following factor(s) being taken into consideration: the size of the microchip, or particularly the distance from the light irradiation region in the main flow channel of the microchip to the inlet of the orifice portion, and/or the velocity of flow of the particles, for example. For the two lights described above, the distance can be the distance from the light irradiation position of the light on the side of the microparticle suction channel to the inlet of the orifice portion, for example. The distance is 300 μm to 1500 μm, for example.

The time $T_0$ is the period of time from the point of time at which microparticles have passed through the predetermined position till the point of time at which the microparticles have reached some position in the region in which microparticles are sucked into the microparticle suction channel in a case where the microparticles are sucked with the suction force $D_0$, for example. Alternatively, the time $T_0$ may be the period of time from the point of time at which the microparticles have passed through the predetermined position till a point of time before the microparticles reach the region.

Figure 8:
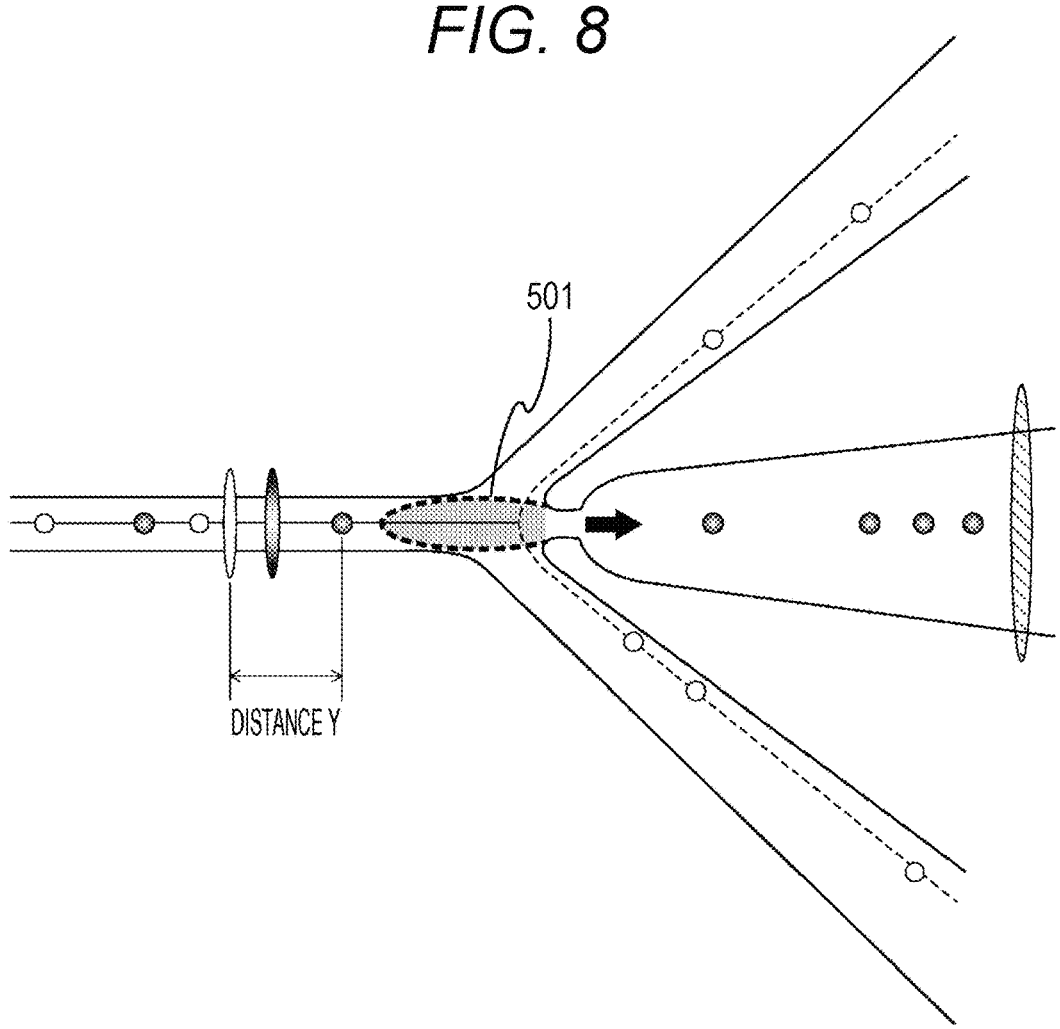
FIG. 8 is a diagram showing a region in which microparticles are sucked into a microparticle suction channel in a case where suctioning is performed under a predetermined condition.

The time $T_0$ is now further described with reference to FIG. 8. FIG. 8 is an enlarged view of the sorting unit 107. In FIG. 8, a region 501 that spreads in an elliptical shape from the inlet of the microparticle suction channel toward the irradiation region is the region in which microparticles are sucked into the microparticle suction channel in a case where the microparticles are sucked with the suction force $D_0$. In FIG. 8, there is particle at a position that is a distance Y ahead of the light irradiation position. The particle has not reached the region. The period of time from the point of time at which the particle passed through the light irradiation position till the point of time at which the particle has traveled the distance Y may be adopted as the time $T_0$. Alternatively, as the time further elapses, the particle reaches the region. The period of time from the point of time at which the particle passed through the light irradiation position till the point of time at which the particle reaches any position in this region may be adopted as the time $T_0$.

In setting the time $T_0$, it is possible to take into consideration the velocity of the particle in the flow channel as necessary. The velocity is measured as appropriate by a technique known to those skilled in the art. For example, in a case where two light irradiation positions 401 and 402 are set as shown in FIG. 7, the velocity of the particle in the flow channel is calculated, on the basis of the distance between the two irradiation positions and the time required for the particle to travel between the two irradiation positions. By such a calculation method, the velocity of particles is calculated with higher precision. Further, as the velocity of particles is calculated with high precision, the suction conditions are optimized in a more preferred manner.

The distance from the predetermined position is also calculated from the velocity and the elapsed time. In another embodiment of the present technology, instead of the time T, the distance Y from the predetermined position may be used as the variable. Specifically, in another embodiment of the present technology, in the particle number counting step, a microparticle sorting procedure is carried out in the microchip under the condition that suctioning by the microparticle suction channel is performed with the predetermined suction force $D_0$ when the microparticles have traveled a predetermined distance $Y_0$ from the predetermined position in the main flow channel toward the microparticle suction channel. The number of the microparticles sucked into the microparticle suction channel as a result of the sorting procedure is then counted. In this embodiment, the distance from the predetermined position at which the suctioning by the microparticle suction channel is to be performed is determined. That is, in the present technology, the distance from the predetermined position at which suctioning is to be performed is optimized, instead of the timing at which suctioning is to be performed. In other words, instead of the time T, the distance Y from the predetermined position may be used as the variable.

The suctioning by the microparticle suction channel with the predetermined suction force $D_0$ is performed by setting a negative pressure in the microparticle suction channel, for example. The negative pressure is set by an actuator, such as a piezo element, for example. Since there is a predetermined relationship between the suction force $D_0$ and the drive voltage of the piezo element, the suction force $D_0$ can be adjusted by adjusting the drive voltage of the piezo element. The drive voltage of the piezo element may be adjusted by means known to those skilled in the art.

In the particle number counting step S301, the microparticle sorting procedure can be carried out with the microparticle sorting device equipped with the microchip described above in <1. Description of Related Technology>, for example. The configuration of the microparticle sorting device is described in greater detail in the specification of Japanese Patent Application No. 2017-102694.

A sample solution containing a known number of microparticles can be used in the microparticle sorting procedure. The number of microparticles may be set as appropriate by those skilled in the art, and is 10 to 1000, or more particularly, 30 to 500, or even more particularly, 50 to 300, for example. In the microparticle sorting procedure, the sample solution containing a known number of microparticles is introduced from the sample solution inlet 101, and then travels in the sample solution channel 102. The sheath solution is also introduced from the sheath solution inlet 103, and then travels in the sheath solution channel 104. The sample solution and the sheath solution merge to form a laminar flow, and the laminar flow then flows in the main flow channel 105 toward the sorting unit 107. Light is emitted onto the laminar flow in the detection region 106. As the microparticles pass through the detection region, scattered light and/or fluorescence is generated from the microparticles. Only in a case where this scattered light and/or fluorescence is detected, suctioning with the suction force $D_0$ is performed at the point of time when the predetermined time $T_0$ has elapsed since the microparticles passed through the predetermined position. For example, in a microparticle sorting procedure using a sample solution containing 100 microparticles, suctioning is performed for each microparticle, which means that suctioning is performed 100 times.

In the particle number counting step S301, the number of microparticles sucked into the microparticle suction channel is counted. For example, in the particle number counting step S301, the number of the microparticles sucked into the microparticle suction channel as a result of the microparticle sorting procedure carried out on the known number of microparticles is counted. The counting may be performed by means known to those skilled in the art, or may be performed in a detection region formed in the microparticle suction channel. The counting of the number of the microparticles can be performed at a predetermined position in the microparticle suction channel. For example, the number of the microparticles is counted by detecting passage of the microparticles through the predetermined position in the microparticle suction channel. An example of the detection region formed in the microparticle suction channel is a light irradiation region 202 shown in FIG. 2, for example. As shown in FIG. 2, as microparticles pass through the light irradiation region 202 formed in the microparticle suction channel, the microparticles generate scattered light and/or fluorescence. As the scattered light and/or fluorescence is detected, the number of microparticles sucked into the microparticle suction channel is counted.

In the present technology, microparticles may be selected as appropriate by those skilled in the art. In the present technology, microparticles can include biological microparticles such as cells, microorganisms, and liposomes, synthetic particles such as latex particles, gel particles, and industrial particles, and the like. In the method according to the present technology, synthetic particles, or more particularly, beads for optimizing the suction conditions, are preferably used as microparticles, and can be used as adjustment microparticles in the present technology. The synthetic particles are more preferable for the method according to the present technology, because the synthetic particles can be more readily obtained than the biological microparticles.

The biological microparticles include chromosomes constituting various cells, liposomes, mitochondria, organelles (cell organelles), and the like. The cells include animal cells (such as blood cells) and plant cells. The microorganisms include bacteria such as *Escherichia coli*, viruses such as tobacco mosaic virus, fungi such as yeast, and the like. The biological microparticles further include biological macromolecules such as nucleic acids, proteins, and complexes thereof. Further, the synthetic particles may be particles formed with an organic or inorganic polymeric material, a metal, or the like, for example. Examples of the organic polymeric material include polystyrene, styrene divinyl benzene, polymethyl methacrylate, and the like. Examples of the inorganic polymeric material include glass, silica, a magnetic material, and the like. Examples of the metal include gold colloids, aluminum, and the like. Normally, the shape of the microparticles may be spherical or nearly spherical, or may be non-spherical. The size and the mass of the microparticles are selected as appropriate by those skilled in the art, depending on the size of the flow channels of the microchip. The size of the flow channels of the microchip is selected as appropriate, depending on the size and the mass of the microparticles. In the present technology, a chemical or biological label, such as a fluorescent dye, for example, can be attached to the microparticles as necessary. The label makes it easier to detect the microparticles. The label to be attached to the microparticles can be selected as appropriate by those skilled in the art.

The microchip to be used in the method according to the present technology is manufactured by a method known in the art. For example, the microchip to be used in the method according to the present technology can be manufactured by bonding two substrates having flow channels formed therein as described above in 1-1. Microparticle Sorting Microchip, for example. The flow channels may be formed in both substrates, or may be formed in only one of the substrates. To make it easier to adjust the position at the time of bonding the substrates, the flow channels may be formed only in one of the substrates.

Materials known in the art can be used as the materials for forming the microchip to be used in the present technology. Examples of the materials include, but are not limited to, polycarbonate, cycloolefin polymer, polypropylene, polydimethylsiloxane (PDMS), polymethylmethacrylate (PMMA), polyethylene, polystyrene, glass, and silicon. Specifically, polymeric materials such as polycarbonate, cycloolefin polymer, and polypropylene are particularly preferable, because those polymeric materials excel in processability and can be used in manufacturing a microchip at low cost using a molding apparatus.

(2) Step S302 of Repeating the Particle Number Counting Step

In a repeating step S302 in FIG. 6, the particle number counting step is repeated, while the time from the point of time at which the microparticles pass through the predetermined position in the main flow channel till the suctioning is performed is changed. For example, the particle number counting step is repeated in the same manner as above, except that the time $T_0$ is changed to various times $T_n$ that are longer and/or shorter than the time $T_0$. The times $T_n$ are set as appropriate by those skilled in the art taking into consideration the size of the microchip, the region in which the suction force is effective in a case where a predetermined suction force is used, and/or the tolerance, for example. In the repeating step S302, the particle number counting step is carried out for each of the various times $T_n$, so that a particle number counting result is obtained for each of the various times $T_n$.

For example, the various times $T_n$ may be the times that are determined by gradually increasing and/or decreasing the time $T_0$ at a predetermined rate. The predetermined ratio is 0.01% to 5%, or more particularly, 0.05 to 2%, or even more particularly, 0.1 to 1%, for example. The number of steps of increasing and/or decreasing the time $T_0$ is 5 to 50, or more particularly, 7 to 40, or even more particularly, 10 to 30, for example. For example, in a case where the various times $T_n$ are those obtained by increasing and decreasing the time $T_0$ by 0.2% in each of 20 steps, the various times $T_n$ are $(T_0+T_0\times0.2\%)$, $(T_0+T_0\times0.2\%\times2)$, $(T_0+T_0\times0.2\%\times3)$, ..., and $(T_0+T_0\times0.2\%\times20)$, and $(T_0-T_0\times0.2\%)$, $(T_0-T_0\times0.2\%\times2)$, $(T_0-T_0\times0.2\%\times3)$, ..., and $(T_0-T_0\times0.2\%\times20)$. In this case, the microparticle sorting procedure can be carried out for each of the 41 (1+20+20) elapsed times in total, including the time $T_0$.

Further, the number of steps of increasing the time $T_0$ and the number of steps of decreasing the time $T_0$ may be the same, or may differ from each other. Furthermore, the various times $T_n$ may be only those obtained by increasing the time $T_0$, or may be only those obtained by decreasing the time $T_0$. The number of steps of increasing the time $T_0$ and the number of steps of decreasing the time $T_0$ can be set as appropriate by those skilled in the art. Further, the particle number counting step may be performed a plurality of times, such as two to five times, or more particularly, two to three times, for each of the various times $T_n$, for example.

The particle number counting steps to be carried out in the repeating step S302 are the same as above, except that the time $T_0$ is changed to the various times $T_n$ that are longer and/or shorter. Therefore, the particle number counting steps are as described above in (1).

(3) Step S303 of determining the time at which suctioning is to be performed

In step S303 of determining the time at which the suctioning illustrated in FIG. 6 is to be performed, the time elapsed since a microparticle passed through the predetermined time, which is the time at which suctioning by the microparticle suction channel is to be performed, is determined on the basis of the number of microparticles counted in the particle number counting step S301, or in the particle number counting step S301 and the repeating step S302. As a result, the point of time at which the suctioning of microparticles is to be performed is optimized. Also, the determination is automatically made by a control unit or the like that executes a predetermined program.

In the determining step S303, the time T in the case where the number of microparticles counted in the particle number counting step S301 and the repeating step S302 is the largest is determined to be the elapsed time at which the suctioning is to be performed, for example. Alternatively, in a case where there are a plurality of times at which the number of microparticles is the largest, any of the plurality of times may be determined to be the elapsed time at which the suctioning is to be performed, or the median value of the plurality of times may be determined to be the elapsed time at which the suctioning is to be performed.

The elapsed time at which the suctioning is to be performed is described below in greater detail, with reference to FIG. 9.

Figure 9:
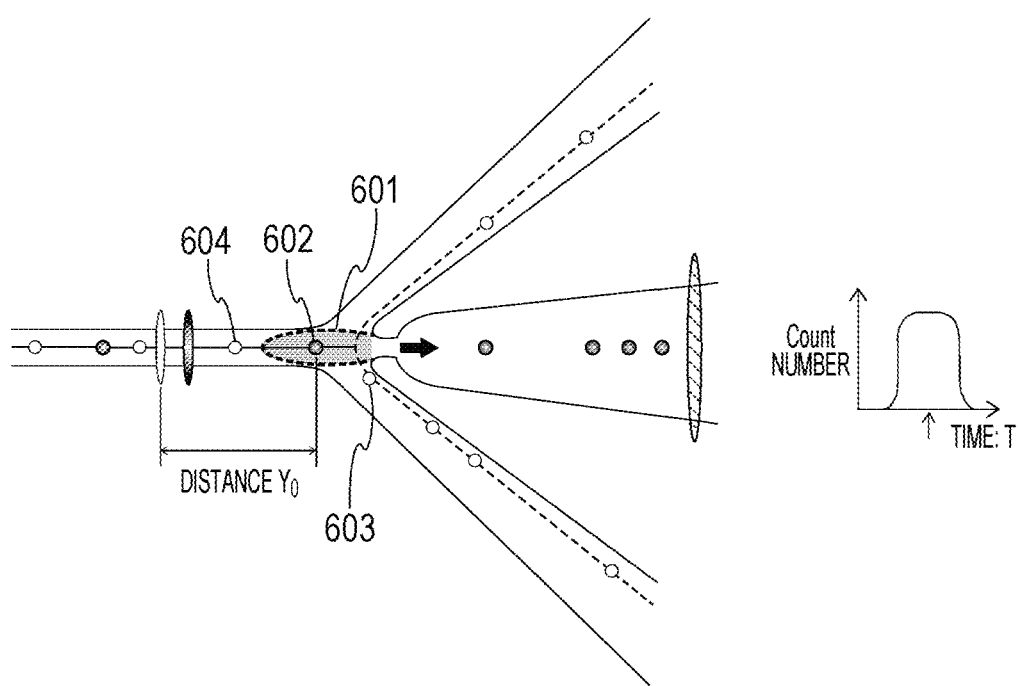
FIG. 9 is a diagram showing a region in which microparticles are sucked into the microparticle suction channel in a case where suctioning is performed under a predetermined condition, and a graph showing the number of counted particles under the condition.

FIG. 9 is a schematic diagram showing the situation in the flow channel in a case where the microparticle sorting procedure is being carried out under the condition that suctioning by the microparticle suction channel is performed with the predetermined suction force $D_0$ at the point of time when the predetermined time $T_0$ has elapsed since a microparticle passed through the predetermined position in the main flow channel. In FIG. 9, a region 601 that spreads in an elliptical shape from the inlet of the microparticle suction channel toward the irradiation region is the region in which microparticles are sucked into the microparticle suction channel in a case where the microparticles are sucked with the suction force $D_0$. In FIG. 9, the predetermined position is one of the two light irradiation positions, which is farther from the microparticle suction channel. A microparticle 602 that has passed through the predetermined position travels from the predetermined position by the distance $Y_0$, and is located at the position shown in FIG. 9 after the predetermined time $T_0$ has elapsed. In a case where suctioning by the microparticle suction channel is performed with the predetermined suction force $D_0$ at the point of time when the predetermined time $T_0$ has elapsed since the passage of the microparticle 602 through the predetermined position, the microparticle 602 is located in the region 601, and therefore, is sucked into the microparticle suction channel.

Note that, as shown in FIG. 9, at the point of time when the predetermined time $T_0$ has elapsed since a microparticle passed through the predetermined position, the microparticle is theoretically in the region 601. However, there are cases where the microparticle is not sucked into the microparticle suction channel, depending on factors such as the condition of the formed laminar flow, the shape of the particle, and/or the actual suction force, for example.

In FIG. 9, in a case where suctioning is performed at time $T_i$ obtained by increasing the time $T_0$, there is a microparticle at a position 603, for example. Even if suctioning is performed with the suction force $D_0$ in a case where there is a microparticle at the position 603, the microparticle is outside the region 601, and therefore, is not sucked into the microparticle suction channel.

Further, in FIG. 9, in a case where suctioning is performed at time $T_j$ obtained by decreasing the time $T_0$, there is a microparticle at a position 604, for example. Even if suctioning is performed with the suction force $D_0$ in a case where there is a microparticle at the position 604, the microparticle is outside the region 601, and therefore, is not sucked into the microparticle suction channel.

Note that, as shown in FIG. 9, at the point of time when the time $T_i$ or $T_j$ has elapsed since a microparticle passed through the predetermined position, the microparticle is theoretically outside the region 601. However, there are cases where the microparticle is sucked into the microparticle suction channel, depending on factors such as the condition of the formed laminar flow, the shape of the particle, and/or the actual suction force, for example.

A graph in which the time $T_0$ is changed to various times, and the number of particles counted at each time is plotted with respect to time is shown on the right side in FIG. 9. As shown in the graph, the number of particles counted becomes the largest in a case where the elapsed time is within a predetermined range. Any appropriate time within the predetermined range may be determined to be the elapsed time at which the suctioning is to be performed, or the median value in the predetermined range may be determined to be the elapsed time at which the suctioning is to be performed.

According to the present technology, in the determining step, the success rate of suctioning of microparticles into the suction flow channel is calculated on the basis of the number of microparticles counted in the particle number counting step and the repeating step, and the time elapsed since the passage through the predetermined position, which is the time at which the suctioning by the microparticle suction channel is to be performed, is determined on the basis of the success rate. For example, the elapsed time in the case where the success rate is the highest may be determined to be the time elapsed since the passage through the predetermined position, which is the time at which the suctioning by the microparticle suction channel is to be performed. Alternatively, any appropriate one of the plurality of the elapsed times at which the success rate is equal to or higher than a predetermined value may be determined to be the elapsed time at which the suctioning is to be performed, or the median value of the plurality of the elapsed times may be determined to be the elapsed time at which the suctioning is to be performed.

2-2. Basic Suction Condition Optimization Method II

The method for optimizing the microparticle suction conditions according to the present technology may further include a second repeating step of repeating the particle number counting step and/or the repeating step while changing the suction force. In a case where the optimization method according to the present technology includes the second repeating step, in the determining step, the time elapsed since a microparticle passed through the predetermined position, which is the time at which suctioning by the microparticle suction channel is to be performed, and the suction force to be used in suctioning of the microparticle is determined, on the basis of the number of microparticles counted in the particle number counting step and/or the repeating step, and in the second repeating step.

Figure 10:
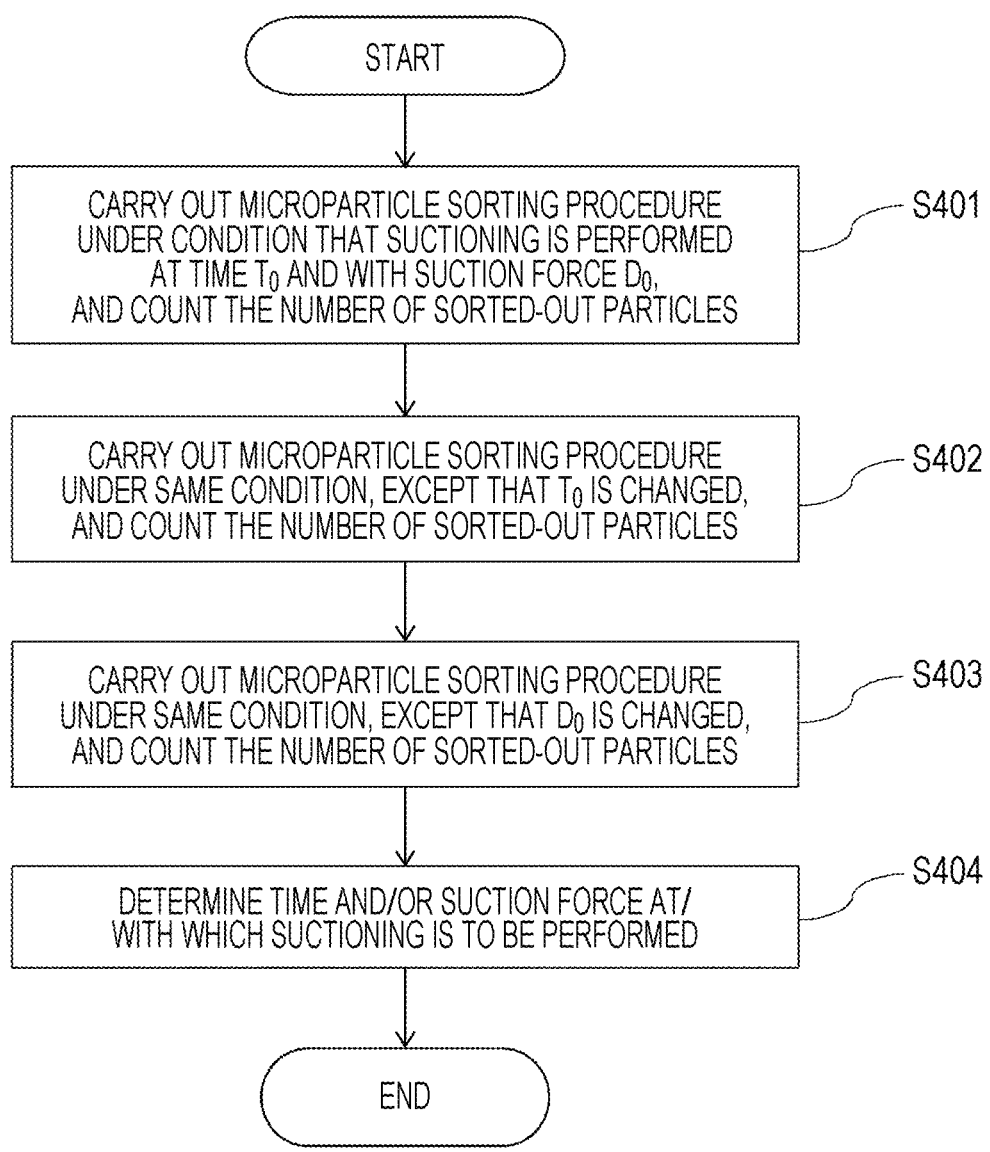
FIG. 10 is a flowchart of a method for optimizing the microparticle suction conditions.

FIG. 10 shows an example flowchart in a case where the optimization method according to the present technology includes the second repeating step. In FIG. 10, steps S401 and S402 are the same as steps S301 and S302 described above in 2-1. Basic Suction Condition Optimization Method I. Therefore, explanation of these steps is not made herein.

(1) Second Repeating Step S403 of Repeating the Particle Number Counting Step

In the second repeating step S403 in FIG. 10, the particle number counting step and/or the repeating step is repeated in the same manner as above, except that the suction force $D_0$ is changed to various suction forces $D_n$ that are greater and/or smaller than the suction force $D_0$. Preferably, in the second repeating step S403 in FIG. 10, a particle number counting step S401 and a repeating step S402 are repeated in the same manner as above, except that the suction force $D_0$ is changed to various suction forces $D_n$. The suction forces $D_n$ are set as appropriate by those skilled in the art taking into consideration factors such as the specifications of the suction means provided in the microparticle suction channel, the size of the microchip, the region in which the suction force is effective in a case where a predetermined suction force is used, and/or the tolerance, for example. In the repeating step S403, the particle number counting step is carried out for each of the various suction forces $D_n$, so that a particle number counting result is obtained for each of the various suction forces $D_n$.

For example, the various suction forces $D_n$ are the respective suction forces obtained by gradually increasing or decreasing the suction force $D_0$ at a predetermined rate. The predetermined rate may be 0.01 to 30%, or particularly, 0.1% to 25%, or more particularly, 1 to 20%, or even more particularly, 1 to 10%, for example. The number of steps of increasing or decreasing the suction force $D_0$ is 3 to 20, or more particularly, 4 to 15, or even more particularly, 5 to 10, for example. In a case where the various suction forces $D_n$ are those obtained by decreasing the suction force $D_0$ by 20% in each of four steps, for example, the various suction forces $D_n$ are $(D_0-D_0 \times 20\%)$, $(D_0-D_0 \times 20\% \times 2)$, $(D_0-D_0 \times 20\% \times 3)$, and $(T_0-T_0 \times 20\% \times 4)$. In this case, the microparticle sorting procedure is carried out for each of the five suction forces in total including the suction force $D_0$.

Further, the number of steps of increasing the suction force $D_0$ and the number of steps of decreasing the suction force $D_0$ may be the same, or may differ from each other. Furthermore, the various suction forces $D_n$ may be only those obtained by increasing the suction force $D_0$, or may be only those obtained by decreasing the suction force $D_0$. The number of steps of increasing the suction force $D_0$ and the number of steps of decreasing the suction force $D_0$ can be set as appropriate in accordance with the value of the suction force $D_0$. Further, the particle number counting step may be performed a plurality of times, such as two to five times, or more particularly, two to three times, for each of the various suction forces $D_n$, for example.

The particle number counting step to be carried out in the second repeating step S403 is the same as steps S301 and S302 described above in 2. Basic Suction Condition Optimization Method I, except that the suction force $D_0$ is changed to a smaller or greater suction forces $D_n$. Therefore, the particle number counting step is as described above in (1) and (2) in 2-1. Basic Suction Condition Optimization Method I.

(2) Step S404 of Determining the Time at which Suctioning is to be Performed and/or the Suction Force to be Applied In step S404 of determining the time at which suctioning is to be performed and/or the suction force to be used in FIG. 10, the time elapsed since passage through the predetermined position, which is the time at which suctioning by the microparticle suction channel is to be performed, and the suction force to be used in suctioning of microparticles are determined, on the basis of the number of microparticles counted in the particle number counting step S401, the repeating step S402, and the second repeating step S403. As a result, the point of time at which the suctioning of microparticles is to be performed, and the suction force to be used are optimized. Also, the determination is automatically made by a control unit or the like that executes a predetermined program, for example.

In the determining step S404, the time T and the suction force D in the case where the number of microparticles counted in the particle number counting step S401, the repeating step S402, and the second repeating step S403 is the largest, and the suction force is the smallest are determined to be the elapsed time at which the suctioning is to be performed, and the suction force to be used, for example.

Alternatively, from among the combinations of the times $T_n$ and the suction forces $D_n$ in cases where a predetermined number or more of microparticles have been counted, the suction force D that is the smallest suction force may be determined to be the suction force to be used, and the median value of the plurality of the elapsed times in which a predetermined number or more of microparticles have been counted with the determined suction force may be determined to be the elapsed time after which the suctioning is to be performed.

Alternatively, in a case where a predetermined number or more of microparticles have been counted, and there are two or more combinations of the time at which the suction force is minimized and the suction force, any appropriate one of those combinations of a time and a suction force may be determined to be the elapsed time after which the suctioning is to be performed and the suction force to be used. Further, in a case where a predetermined number or more of microparticles have been counted, and there are two or more combinations of the time at which the suction force is minimized and the suction force, the minimum value of the suction force may be determined to be the suction force to be used, and the median value of the plurality of times may be determined to be the elapsed time after which the suctioning is to be performed.

The elapsed time after which the suctioning is to be performed and the suction force to be used are described below in greater detail, with reference to FIGS. 9 and 11.

As described above, FIG. 9 is a schematic diagram showing the situation in the flow channel in a case where the microparticle sorting procedure is being carried out. As described above, in a case where suctioning by the microparticle suction channel is performed with the predetermined suction force $D_0$ at the point of time when the predetermined time $T_0$ has elapsed since the passage of the microparticle 602 through the predetermined position, the microparticle 602 is located in the region 601, and therefore, is sucked into the microparticle suction channel.

Figure 11:
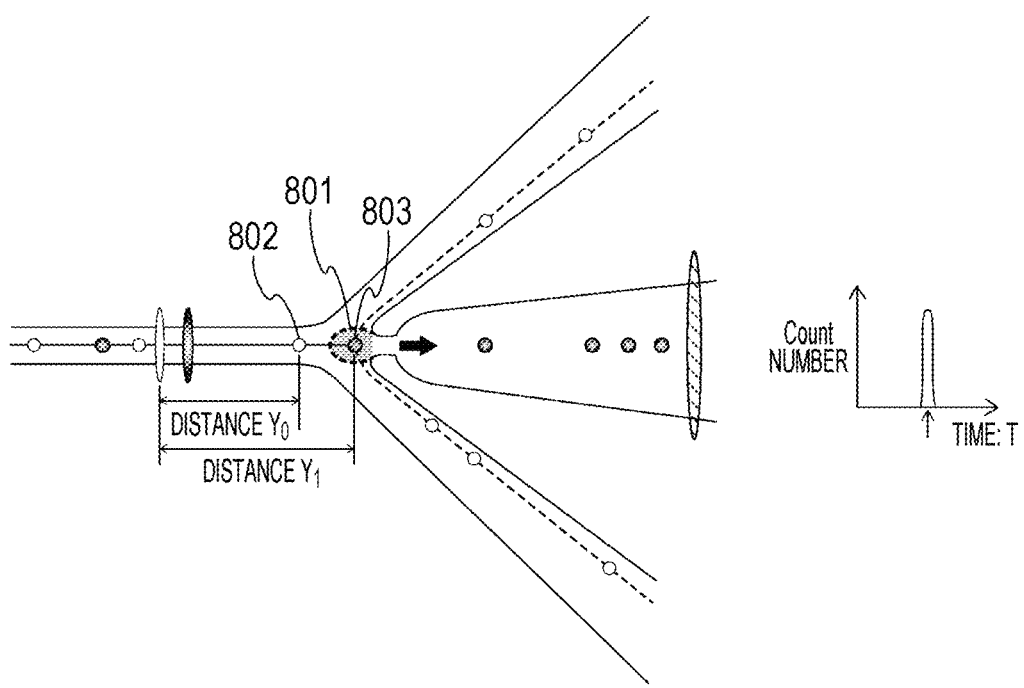
FIG. 11 is a diagram showing a region in which microparticles are sucked into the microparticle suction channel in a case where suctioning is performed under a predetermined condition, and a graph showing the number of counted particles under the condition.

FIG. 11 is a schematic diagram showing the situation in the flow channel in a case where the microparticle sorting procedure is being carried out under the condition that suctioning by the microparticle suction channel is performed with a smaller suction force $D_n$ than the suction force $D_0$ at the point of time when a predetermined time $T_0$ or $T_1$ has elapsed since a microparticle passed through the predetermined position in the main flow channel. In FIG. 11, a region 801 that spreads in an elliptical shape from the inlet of the microparticle suction channel toward the irradiation region is the region in which microparticles are sucked into the microparticle suction channel in a case where the microparticles are sucked with the suction force $D_n$. In FIG. 11, the predetermined position is one of the two light irradiation positions, which is farther from the microparticle suction channel.

A microparticle 802 that has passed through the predetermined position travels from the predetermined position by the distance $Y_0$, and is located at the position shown in FIG. 11 after the predetermined time $T_0$ has elapsed. In a case where suctioning is performed with the suction force $D_0$ as shown in FIG. 9 at the point of time when the microparticle 802 is located at this position, the microparticle 802 is in the region 601, and therefore, is sucked into the microparticle suction channel. However, in a case where suctioning is performed with the suction force $D_n$ as shown in FIG. 11 at the point of time when the microparticle 802 is located at this position, the microparticle 802 is outside the region 801, and therefore, is not sucked into the microparticle suction channel.

Meanwhile, a microparticle 803 that has passed through the predetermined position travels from the predetermined position by the distance $Y_1$, and is located at the position shown in FIG. 11 after the predetermined time $T_1$ has elapsed. In a case where suctioning by the microparticle suction channel is performed with the predetermined suction force $D_n$ at the point of time when the predetermined time $T_1$ has elapsed since the passage of the microparticle 803 through the predetermined position, the microparticle 803 is located in the region 801, and therefore, is sucked into the microparticle suction channel.

As described above, the smaller the suction force, the narrower the region in which the suction force is effective.

A graph in which the time $T_0$ is changed to various times, and the number of particles counted at each time is plotted with respect to time is shown on the right side in FIG. 11. As shown in the graph, the range of the time T in which the count number becomes larger is narrower than the range in the graph shown on the right side in FIG. 9. In this manner, the smaller the suction force, the narrower the range of the time T in which the count number becomes larger. As the elapsed time after which suctioning is to be performed is adopted from the narrower range of the time T, and a smaller suction force is adopted as the suction force to be used, the elapsed time after which microparticle suctioning is to be performed, and the suction force to be used are optimized.

According to the present technology, in the determining step, the success rate of suctioning of microparticles into the suction flow channel is calculated on the basis of the number of microparticles counted in the particle number counting step, the repeating step, and the second repeating step, and the time elapsed since the passage through the predetermined position, which is the time at which the suctioning by the microparticle suction channel is to be performed, and/or the suction force to be used is determined, on the basis of the success rate.

For example, the time T and the suction force D in the case where the success rate is the highest and the suction force is the smallest are determined to be the elapsed time after which the suctioning is to be performed and the suction force to be used.

Alternatively, from among the combinations of the times $T_n$ and the suction forces $D_n$ in cases where the success rate is equal to or higher than a predetermined rate, the time T at which the suction force is minimized and the suction force D may be determined to be the elapsed time after which the suctioning is to be performed and the suction force to be used.

Alternatively, in a case where a success rate equal to or higher than a predetermined rate has been achieved, and there are two or more combinations of the time at which the suction force is minimized and the suction force, any appropriate one of those combinations of a time and a suction force may be determined to be the elapsed time after which the suctioning is to be performed and the suction force to be used. Further, in a case where a success rate equal to or higher than a predetermined rate has been achieved, and there are two or more combinations of the time at which the suction force is minimized and the suction force, the minimum suction force may be determined to be the suction force to be used, and the median value of the plurality of times may be determined to be the elapsed time after which the suctioning is to be performed.

(3) Preferred Embodiment of the Second Repeating Step S404

According to a preferred embodiment, in the second repeating step S404, the suction force is gradually reduced from the suction force $D_0$ at a predetermined rate, and the second repeating step is performed until such a result is obtained that the number of the microparticles sucked into the microparticle suction channel is 0 in a case with any elapsed time. In this case, in the determining step, the suction force increased at a predetermined rate from the suction force in a case where such a result is obtained that the number of sucked microparticles is 0 in a case with any elapsed time is determined to be the suction force that is to be used in microparticle suctioning. Thus, the suction force can be automatically optimized.

The changes in the situation in the flow channel in a case where the suction force is reduced from the suction force $D_0$ are as described above with reference to FIGS. 9 and 11. The predetermined ratio and the number of the reducing steps are as described above in (1).

Figure 12:
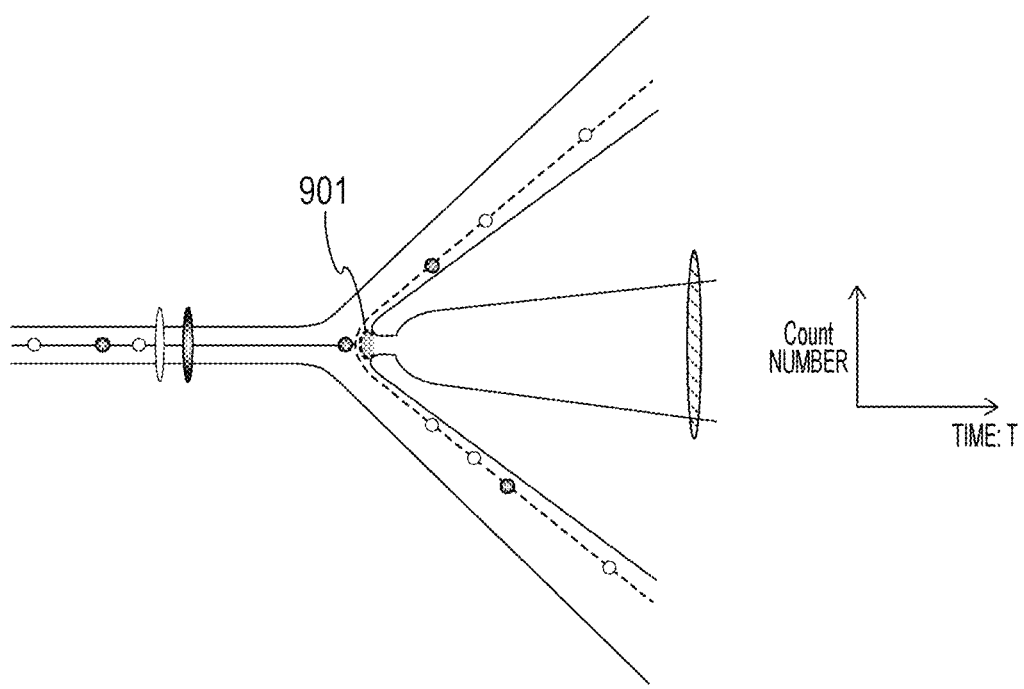
FIG. 12 is a diagram showing a region in which microparticles are sucked into the microparticle suction channel in a case where suctioning is performed under a predetermined condition, and a graph showing the number of counted particles under the condition.

The situation in the flow channel in a case where such a result is obtained that the number of the microparticles sucked into the microparticle suction channel is 0 in a case with any elapsed time is described below, with reference to FIG. 12. In FIG. 12, a solid line and a dashed line in the flow channel indicate the positions through which microparticles pass. In FIG. 12, a region 901 that spreads slightly from the inlet of the microparticle suction channel toward the irradiation region is the region in which microparticles are sucked into the microparticle suction channel in a case where the microparticles are sucked with a smaller suction force $D_Z$ than a suction force $D_1$. As shown in FIG. 12, the region 901 overlaps with neither the solid line nor the dashed line indicating the positions through which microparticles pass. Accordingly, even if suctioning is performed in a case with any elapsed time, the microparticles are not sucked. A graph in which the time $T_0$ is changed to various times, and the number of particles counted at each time is plotted with respect to time is shown on the right side in FIG. 12. As shown in the graph, the count number is 0, regardless of after which elapsed time suctioning is performed.

The second repeating step is carried out until such a result is obtained that the number of the microparticles sucked into the microparticle suction channel is 0 in a case with any elapsed time. That is, the second repeating step is ended in a case where such a result has been obtained that the number of the microparticles sucked into the microparticle suction channel is 0 in a case with any elapsed time. After that, in the determining step, the suction force increased at a predetermined rate from the suction force in the case where such a result has been obtained that the number of sucked microparticles is 0 in a case with any elapsed time is determined to be the suction force that is to be used in microparticle suctioning.

The amount by which the suction force is to be increased from the suction force in the case where such a result has been obtained that the number of sucked microparticles is 0 in the case with any elapsed time can be determined as appropriate by those skilled in the art in determining which suction force is to be used in microparticle suctioning, on the basis of factors such as the predetermined rate and the number of steps of reducing the suction force in the gradual decrease in the suction force in the second repeating step S404, the value of the suction force $D_0$ adopted in step 401, and/or the size of the flow channel. For example, in a case where the suction force $D_0$ is reduced by 1 to 10% at each time, the value obtained by adding a value of, for example, (the reduction rate (1 to 10%)×1) to (the reduction rate×5), to the suction force with which such a result has been obtained that the number of sucked microparticles is 0 in the case with any elapsed time is determined to be the suction force to be used. For example, in a case where the suction force $D_0$ is reduced by 10% at each time, and such a result has been obtained that the number of sucked microparticles is 0 in the case with any elapsed time with a suction force $(D_0-D_0\times80\%)$, $[(D_0-D_0\times80\%)+D_0\times20\%]$, which is a value $(D_0-D_0\times60\%)$, is determined to be the suction force to be used.

2-3. Phenomena During Microparticle Suctioning

The technique of the method for optimizing microparticle suction conditions is implemented when the sample core is extremely small with respect to the sheath flow.

Specifically, it is assumed that the velocity of the microparticles flowing in the sample core is constant, and suctioning is performed in such a manner as to optimize the microparticle sorting timing and the sorting suction amount of the microparticle-containing sample solution (the actuator driving force). In a situation where there is no difference in the velocity of the microparticles in the sample core as above, even if the velocity of the sheath flow changes, the optimum sorting timing at the microparticle velocity can be automatically calculated.

Further, in a case where the amount of sorting suction of the microparticles to be collected is large, the microparticles to be collected are sorted out without fail, but a long time is required for the suction actuator to recover (to return to a state in which the microparticles can be sucked). Therefore, adjusting the amount of suction of the microparticle-containing sample solution is critical in achieving the maximum sorting speed in the microparticle sorting microchip.

Meanwhile, to achieve the processing capacity (sorting speed) for sorting the microparticles to the maximum extent, the microparticles that flow in the microparticle sorting microchip per constant time and are to be collected need to be appropriate, and it is necessary to adjust the particle concentration in the microparticle-containing sample solution or the inflow of the microparticle-containing sample solution.

Since the concentration of a microparticle-containing sample solution is normally adjusted in a pretreatment for setting the microparticle-containing sample solution in the microparticle sorting device described below, concentration adjustment is not performed while the device is processing. Instead, the number of microparticles to pass through in one second with the amount of supply of the sample solution is adjusted (the number will be hereinafter also referred to as the "sample event rate"). Therefore, the size of the sample core in the main flow channel of the microparticle sorting microchip is determined by the amount of supply of the microparticle-containing sample solution. In a case where the sample event rate for a sample solution having a low microparticle concentration is to be increased, it is necessary to increase the amount of supply of the microparticle-containing sample solution, and the size of the sample core becomes larger accordingly.

Figure 13:
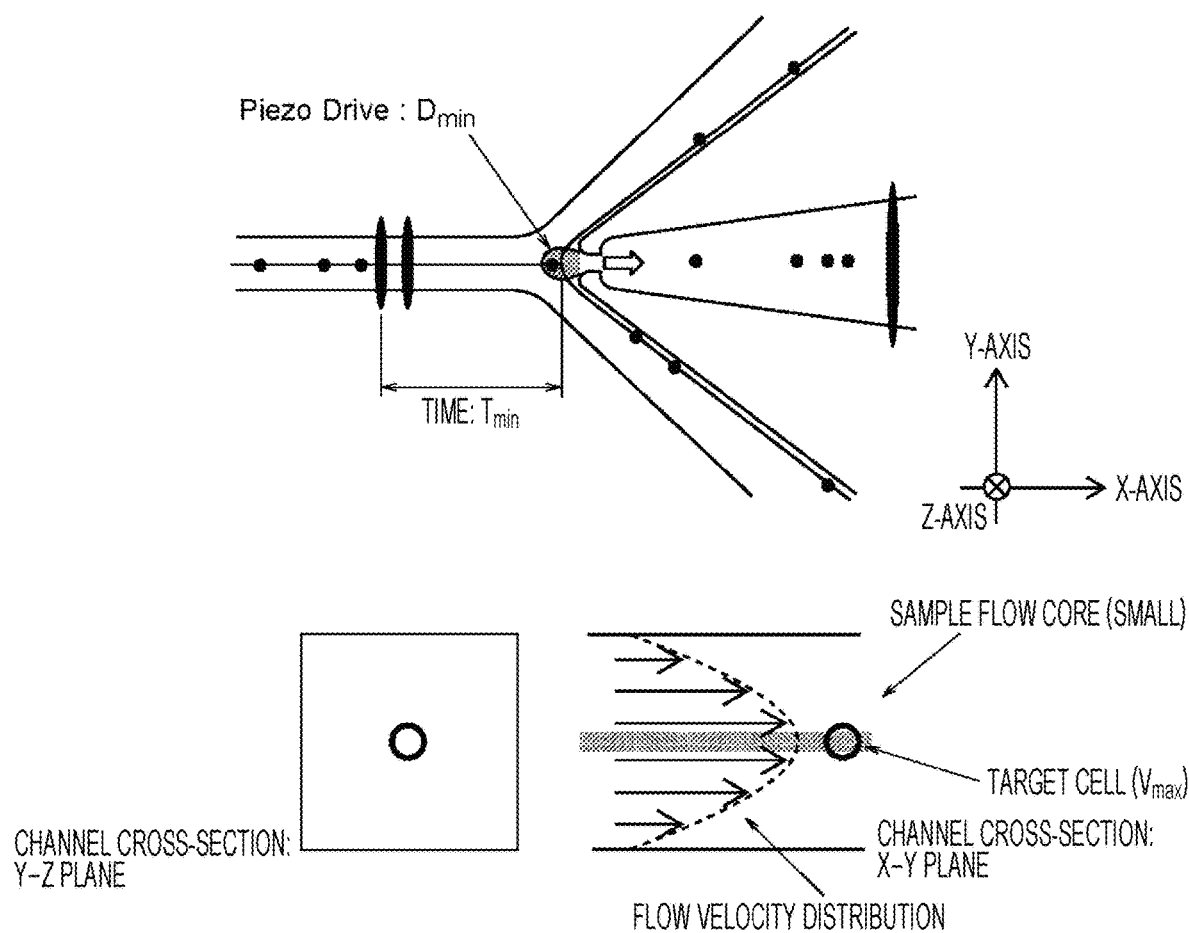
FIG. 13 is a diagram showing how microparticles flow in a case where the flow rate of the microparticle-containing sample solution is low, and the sample core size is small.
Figure 14:
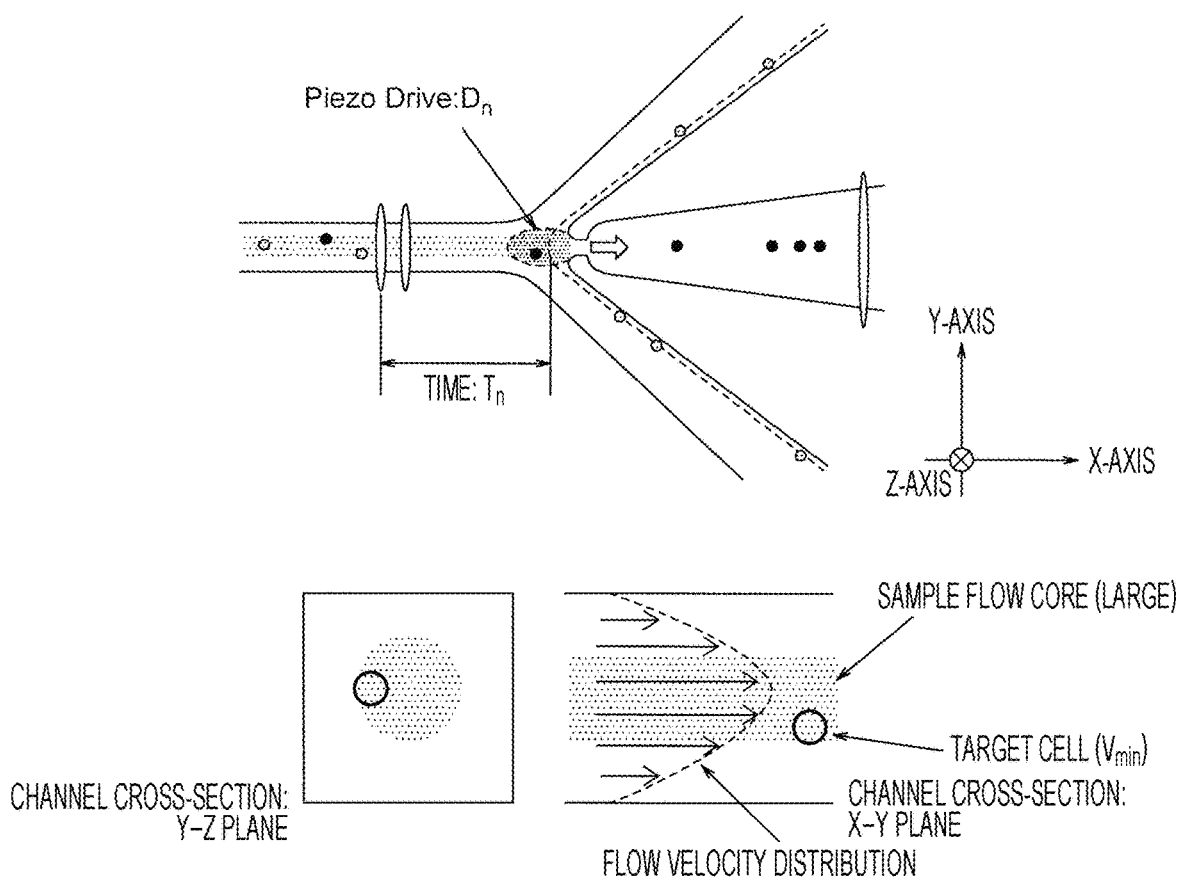
FIG. 14 is a diagram showing how microparticles flow in a case where the flow rate of the microparticle-containing sample solution is high, and the sample core size is large.

FIG. 13 illustrates a case where the flow rate of the microparticle-containing sample solution is low, and the size of the sample core is small. FIG. 14 illustrates a case where the flow rate of the microparticle-containing sample solution is high, and the size of the sample core is large.

To sort microparticles, the pressure chamber is actuated to generate a minute negative pressure so that particle suctioning is performed. Therefore, in a case where the size of the sample core is larger, there is a large number of particles passing through a position farther from the sample suction inlet located at the center of the main flow channel, and those particles cannot be stably sucked with the sorting suction amount (the actuator driving force) for a small sample core size.

In such a situation, preferred sorting performance cannot be expected while the sorting suction amount is fixed. Therefore, there is a demand for control on optimization of the suction amount suited to the position through which the microparticles are to pass.

In view of the above, a suction condition optimization method according to the present technology has been developed as described below.

2-4. Suction Condition Optimization Method Corresponding to the Size of a Sample Core It is widely known that, in a fluid supply in a general microspace, the velocity of the solution supplied is affected by the viscosity of the fluid and the wall surface, and forms a Hagen-Poiseuille flow.

In the present technology, in a case where the size of the sample core is small, the region in which microparticles pass through the main flow channel is also small. Therefore, the velocity of each microparticle can be regarded as uniform. However, if the location at which the sample core flows is the center of the main flow channel, the velocity of each microparticle is twice as high as the average flow velocity, according to the Hagen-Poiseuille theorem. In a case where the size of the sample core is large, on the other hand, the region in which microparticles pass through the main flow channel is also large. Therefore, the microparticle velocity scatters, and the microparticle velocity drops in inverse proportion to the distance from the center of the main flow channel.

In view of the above, attention was paid to the Hagen-Poiseuille phenomenon, and the parameters shown below were defined.

$V$: the velocity of each of the microparticles in a group during a certain time (one second, for example)

$V_{ave}$: the average velocity of the microparticles in the group $V_{max}$: the highest individual microparticle velocity among the individual microparticles in the group of microparticles $V_{min}$: the lowest individual microparticle velocity among the individual microparticles in the group of microparticles Here, the certain time can be the time required for a microparticle to travel from a predetermined position in the main flow channel to the sorting position. This time can be referred to as the time t.

In the Hagen-Poiseuille phenomenon, the microparticles passing through the central portion (substantially the center) of the sample core during the time t have the velocity $V_{max}$, and the microparticles passing through the outermost portion (approximately the outermost portion) of the sample core during the time t have the velocity $V_{min}$. In the present technology, data of at least one of the average velocity $V_{ave}$, the maximum velocity $V_{max}$, or the minimum velocity $V_{min}$ among the individual microparticles is acquired, and is used in the suction condition optimization method.

For example, if the average flow velocity $V_{ave}$ is used to normalize the respective microparticle velocities ($V/V_{ave}$), the result can be used as an index of the distance from the center of the main flow channel. At that time, it is preferable to calculate each $V/V_{ave}$, using the data of the velocities $V$ of as many individual microparticles as possible, or more preferably, the data of the velocities $V$ of all the microparticles passing through the vicinity of the center of the flow channel. In this manner, a more preferable approximate value of the central flow velocity of the sample core can be obtained. Further, even if there is a turbulent flow generated due to the microchip for microparticles, a turbulent flow generated due to generation of a pulsating flow derived from driving of the actuator, or turbulent flows generated due to other reasons, it is possible to detect the central flow velocity of the sample core more accurately than in conventional cases.

Figure 15:
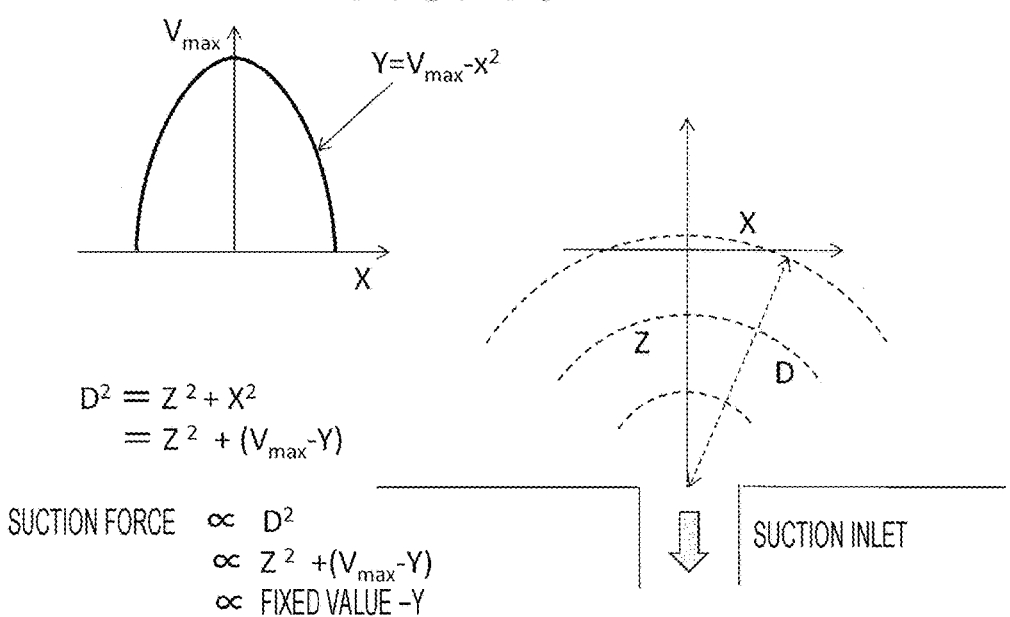
FIG. 15 is a schematic diagram for explaining a Hagen-Poiseuille phenomenon applied to the present technology.

This aspect is now described in greater detail, with reference to FIG. 15.

On the basis of the Hagen-Poiseuille phenomenon, normally, the particle velocity in a conventional flow channel becomes lower in proportion to the square of X, which is the distance from the center of the flow channel, and is expressed in Expression 1: $Y=V_{max}-X^2$.

On the other hand, the distance from the suction port (the microparticle sorting microchip according to the present technology) shown in FIG. 15 to a particle is expressed by Expression 2: $D^2=Z^2+X^2$, where Z (a fixed value) represents the distance in the flow direction, and X represents the distance from the center as described above.

As the pressure required for suctioning needs to be proportional to the square of the distance from the suction port, Expression 3: $D^2=Z^2+(V_{max}-Y)$ should be satisfied, according to Expressions 1 and 2 mentioned above. Since Z and $V_{max}$ are fixed values, the optimum suction force can be expressed by Expression 4: fixed value−Y.

If this is applied to the present technology, Y corresponds to the velocity V of each individual microparticle. Accordingly, the velocity V of each individual microparticle is plugged in Expression 4, so that the desired suction force, which is the desired actuator driving force, can be calculated.

Although $V/V_{ave}$ is used in the present technology, the measured velocity of each individual microparticle is normalized with $V_{ave}$ as described above, and therefore, the same coefficient can be used, regardless of velocities.

On the basis of $V/V_{ave}$, the actuator driving force during suctioning is controlled so as to be inversely proportional to $V/V_{ave}$. Accordingly, the microparticles at the center of the sample core (the velocity $V_{max}$) can be sucked with a small driving force, and the particles farther from the center of the sample core (the velocity $V_{min}$) can be sucked with a large driving force. Thus, the sorting suction force suited to the particle position from the sorting suction inlet can be individually controlled.

Therefore, in the above method for optimizing the microparticle suction conditions, the microparticle sorting procedures illustrated in FIGS. 6 and 10 should include:

the step of acquiring data of the velocity V of each individual microparticle by introducing the sheath solution and the microparticle-containing sample solution into the main flow channel, and detecting the point of time at which each microparticle passes through the predetermined position in the main flow channel; and the step of controlling the driving of the actuator in inverse proportion to the index calculated by $V/V_{ave}$, where $V_{ave}$ represents the average velocity of the microparticles during the certain time in the velocity data.

Further, when the microparticles flow through the substantially central portion of the microparticle-containing sample solution, the maximum velocity among the microparticles during the certain time is set as $V_{max}$, the driving of the actuator with $V_{max}$ is made smaller than that with $V_{ave}$, and the pressure in the pressure chamber is increased, so that the suction force acting on the microparticles becomes smaller. Using $V/V_{max}$ as an index, the pressure is controlled in inverse proportion to $V/V_{max}$.

Furthermore, when the microparticles flow through the substantially outermost portion of the microparticle-containing sample solution, the minimum velocity among the microparticles during the certain time is set as $V_{min}$, the driving of the actuator with $V_{ave}$ is made greater than that with $V_{ave}$, and the pressure in the pressure chamber is reduced, so that the suction force acting on the microparticles becomes greater.

As the method for optimizing the microparticle suction conditions according to the present technology is applied to the microparticle sorting system described later, it is possible to maintain the maximum sorting capacity by increasing the flow rate of the sample solution even in a case where the microparticle concentration is low, and reduce degradation of the sorting performance.

Furthermore, it is possible to maintain excellent microparticle sorting characteristics, even in a sorting state with a large sample core size, such as the case of a concentration process (to process a large number of microparticles, though the purity of the microparticles to be collected is low), except for a purification process that puts priority on purity to increase the purity of the particles to be collected to an extremely high level.

3. Embodiments of Microparticle Suction Control

An embodiment of the present technology is a method that is implemented in a microparticle sorting microchip including: a main flow channel in which a sheath solution and a microparticle-containing sample solution flow; and a pressure chamber that sucks microparticles when an actuator is driven, the method including:

the step of acquiring data of a velocity V of an adjustment microparticle by introducing the sheath solution and an adjustment-microparticle-containing sample solution into the main flow channel, and detecting the point of time at which the adjustment microparticle passes through a predetermined position in the main flow channel;

the step of sucking the adjustment microparticle from the main flow channel into the pressure chamber with a predetermined suction force;

the particle number counting step of counting the number of the adjustment microparticles sucked into the pressure chamber;

the step of determining the time elapsed since passage through the predetermined position, on the basis of the time from the point of time at which the adjustment microparticle passed through the predetermined position in the main flow channel till the suctioning is performed, and the number of the counted adjustment microparticles, the suctioning being to be performed after the elapsed time;

the step of acquiring data of a velocity V of each adjustment microparticle by introducing a larger amount of sample solution than the adjustment-microparticle-containing sample solution into the main flow channel, and detecting the point of time at which the adjustment microparticle passes through the predetermined position in the main flow channel; and the step of sorting the adjustment microparticles into the pressure chamber, by controlling the pressure in the pressure chamber in inverse proportion to an index calculated according to $V/V_{ave}$ from the data of the velocity V of each adjustment microparticle of the larger amount of sample solution during a certain time, and the data of the average velocity $V_{ave}$ of the adjustment microparticles during the certain time, for example.

By this method, the microparticle suction conditions can be optimized.

In other words, the step of acquiring velocity data of microparticles and the step of controlling the driving of the actuator that controls the pressure in the pressure chamber are incorporated into the sorting procedure in 2-1. Basic Suction Condition Optimization Method I. Thus, the timing to perform suctioning and/or the magnitude of the suction force to be used are further optimized, and the microparticle sorting performance can be further improved.

In the case illustrated in FIG. 6, the step of acquiring velocity data of microparticles and the step of controlling the driving of the actuator should be incorporated into the sorting means in step S301 and/or the sorting procedure in step S302.

Furthermore, the microparticle suction condition optimization method may further include the particle number counting step of counting the number of the adjustment microparticles sucked into the pressure chamber, after the step of sorting the adjustment microparticles into the pressure chamber, in which the number of times the adjustment microparticle has been sorted into the pressure chamber may be compared with the number of counted particles of the sorted-out adjustment microparticles, and, when it is determined that not all the adjustment microparticles have been sorted, the driving of the actuator may be made greater and/or smaller, and a constant with which the number of the counted particles of the sorted adjustment microparticles becomes substantially the same as the total number of the supplied adjustment microparticles may be calculated.

In other words, the step of acquiring velocity data of microparticles described below and the step of controlling the driving of the actuator may be incorporated into the sorting procedure in 2-2. Basic Suction Condition Optimization Method II.

In the case illustrated in FIG. 10, the step of acquiring velocity data of microparticles and the step of controlling the driving of the actuator should be incorporated into the sorting procedure in one of steps S401, S402, and S403, an appropriate combination of these steps, or all the steps.

Alternatively, steps S301 through S303 in FIG. 6 may be first carried out, and steps S401 through S403 created by incorporating the step of acquiring velocity data of microparticles and the step of controlling the driving of the actuator into the sorting procedure in one of steps S401, S402, and S403 in FIG. 10, or all of the steps may be then carried out. At last, step S404 may be carried out.

In another example, steps S301 through S303 in FIG. 6 may be first carried out, and steps S401 through S404 in FIG. 10 may be then carried out. Further, the step of acquiring velocity data of microparticles and the step of controlling the driving of the actuator may be incorporated into the sorting procedure in one of steps S301, S302, S401, S402, and S403, an appropriate combination of these steps, or all the steps.

3-1. Embodiment I

As a specific example, an example of the adjustment procedures in a microparticle suction condition optimization method according to the present technology is now described.

In this example, when the driving force and operation of the actuator for the pressure chamber of a microparticle sorting microchip are adjusted by the microparticle suction optimization method according to the present technology, microbeads from which scattered light generated by light irradiation can be detected are used as adjustment microparticles, for example.

Then, on the basis of information about the behavior of the adjustment microbeads obtained from the scattered light, the microparticle sorting timing T and the suction force D are optimized in the adjustment procedures 1 through 15 shown below. Note that a piezo element is used as the actuator.

Adjustment procedure 1: The microparticle sorting microchip and the adjustment microbeads are set in a microparticle sorting device, and a sheath solution is introduced. An automatic adjustment program is then started.

Adjustment procedure 2: After the chip for sorting microparticles and the micro flow channels of the microparticle sorting device are deaerated with the sheath solution, the adjustment microbeads are introduced (the sample core size being very small), and chip position adjustment (X-axis, Y-axis, and Z-axis) is performed so that the signal intensity (scattered light or a fluorescent signal) from the microparticles is maximized.

Adjustment procedure 3: The scattered signal at a laser detection unit and a post-sorting detection unit is acquired with the optical system shown in FIG. 5, and the velocity V of each particle is calculated from the passage time difference between two spots in a laser sorting unit (the time t required for a microparticle to travel from a predetermined position in the main flow channel to the sorting position).

Adjustment procedure 4: The distance Y to the sorting unit is used as the variable for sweeping, and the sorting operation time T=Y/V, which depends on the velocity of each particle, is calculated.

Adjustment procedure 5: The actuator driving force that maximizes the suction force for sorting microparticles is represented by $D_1$, and an operation is performed with the actuator driving force $D_1$ at a time that is set by adding the sorting operation time T=Y/V to the time of passage through an optical detection unit. The sorted-out particles guided into the sorting channel at that time are then counted by the post-sorting detection unit.

Adjustment Procedure 6: While the actuator driving force $D_1$ remains fixed, the distance Y is swept to change the sorting time. The sorted-out particles at that time are detected, and a count number distribution is obtained. A distance $Y_1$ (sorting time) that is the center value with which the acquired particle count number becomes maximum or approximately maximum is calculated, and the optimum sorting distance $Y_1$ (sorting time) with the actuator driving force $D_1$ is recorded.

Adjustment procedure 7: A detection operation similar to that in adjustment procedure 6 is performed with an actuator driving force $D_2$ that has a smaller sorting suction amount than in adjustment procedure 5, and the optimum sorting distance $Y_2$ (sorting time) is recorded.

Adjustment procedure 8: A detection operation similar to that in adjustment procedure 6 is performed with the actuator driving force $D_2$ that has a smaller sorting suction amount, and the optimum sorting distance $Y_2$ (sorting time) is recorded.

Adjustment procedure 9: In a case where the sorting suction amount is further reduced, and an optimum sorting distance $Y_3$ (sorting time) is calculated in a detection operation similar to that in adjustment procedure 6 with an actuator driving force $D_3$, if the sorting suction amount becomes too small, an operation for introduction into the sorting flow channel cannot be realized, regardless of the distance Y (sorting time).

Adjustment procedure 10: The actuator driving force $D_2$, which is slightly greater than the actuator driving force $D_3$ with which the count number of the sorted-out particles is 0, and the sorting distance $Y_2$ (sorting time) are adopted as optimum sorting parameters, and a sorting operation is performed.

Adjustment procedure 11: Adjustment beads are introduced in an amount several times (10 times, for example) larger than the amount of the introduced sample solution in adjustment procedure 2, and the scattered signals at the laser detection unit and post-sorting detection unit are detected by the optical system shown in FIG. 5. The velocity V of each particle is then calculated from the passage time difference between two spots in the laser sorting unit.

Adjustment procedure 12: The average particle velocity (one second, for example) during a certain time is represented by $V_{ave}$, and the particle velocity V is divided by $V_{ave}$, to obtain a coefficient inversely proportional to the particle position from the center of the sample core.

Adjustment procedure 13: To obtain a sorting suction force suitable for the particle position, the actuator driving force is set as $D_2 \div (V/V_{ave})*K$, and sorting is performed. (K is a constant obtained from advance verification.)

Adjustment procedure 14: Under the above conditions, if the number of times sorting has been performed and the count number of the sorted-out particles are almost 100%, the adjustment is ended. However, in a case where those numbers are smaller than 100%, the value of K is searched for in ±ranges, and a sorted-out particle count distribution is obtained.

Adjustment procedure 15: The K-value of the center value of the distribution in which the sorted-out particle count is close to 100% or is 100% is adopted as a sorting condition.

Adjustment procedure 16: The feeding of the sample solution is stopped, the flow channel in which the sample flows and the other flow channels are washed with the sheath solution, and the automatic adjustment is then ended.

As the microparticle suction conditions according to the present technology are optimized through the above adjustment procedures, the optimum sorting timing T and the suction amount D for sorting out the microparticles to be collected can be adjusted. Furthermore, even in a situation where the sample core is large, and microparticle positions in the main flow channel of the microparticle sorting microchip vary, the suction force can be automatically adjusted to the optimum suction amount suitable for the microparticle positions. Accordingly, even if the amount of supply of the sample solution increases/decreases, excellent sorting performance can be maintained. Thus, a high robustness can be maintained even in the microparticle sorting system described later.

3-2. Embodiment II

Figure 16:
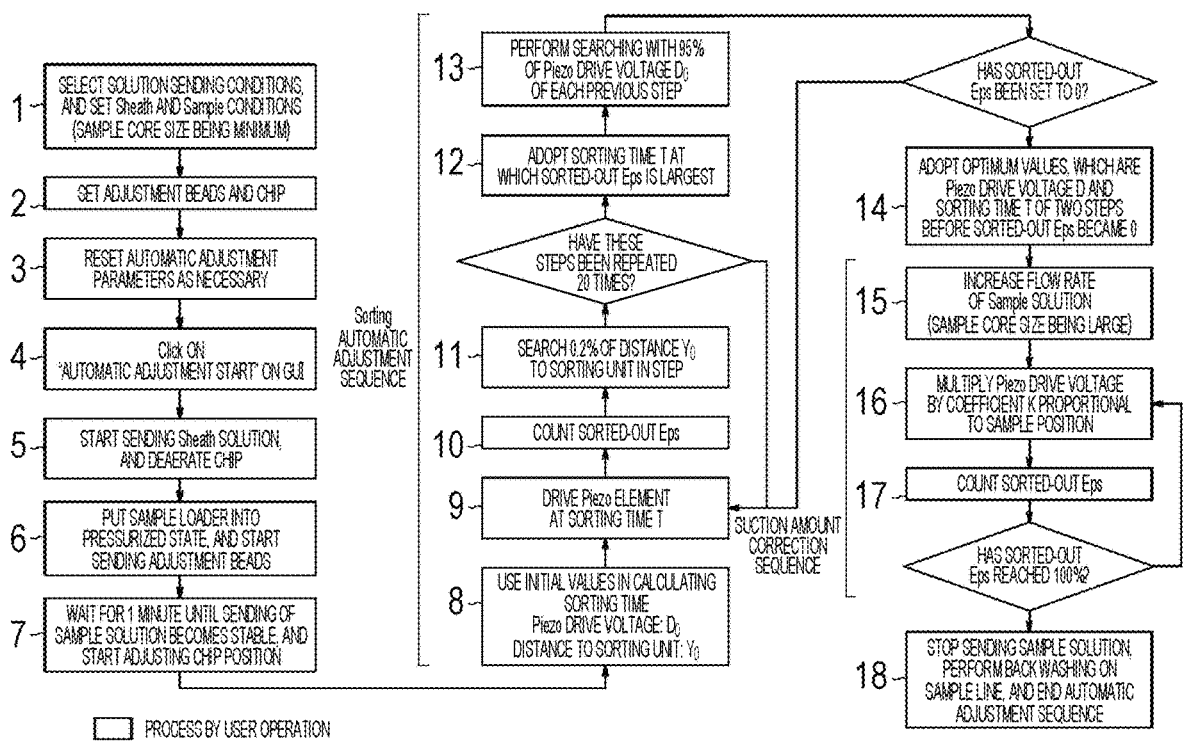
FIG. 16 is a flowchart showing an example of microparticle suction control.

As a more specific example, optimization of the microparticle suction conditions according to the present technology can be performed as shown in the flowchart in FIG. 16.

In the description below, each process shown in FIG. 16 is explained. Note that a piezo element is used as the actuator.

Process 1: The conditions for introducing a sheath solution and a microparticle-containing sample solution are set in a microparticle sorting device on which the program described later has been installed. The solution introduction conditions can be specified beforehand so that the sample core size is minimized.

Process 2: A microparticle sorting microchip and adjustment microbeads are set in the microparticle sorting device.

Process 3: The automatic adjustment parameters that are incorporated beforehand into the program and are to be used for optimizing the microparticle suction conditions are reset as necessary.

Process 4: On a user interface (a GUI, for example) such as a touch panel, the button for starting automatic adjustment of the microparticle sorting device is clicked on.

Process 5: The sheath solution is introduced, and an automatic adjustment program is started. The sheath solution deaerates the flow channel and the like of the microparticle sorting microchip that has been set.

Process 6: A sample loader that is provided in the microparticle sorting device and is to be used to introduce the microparticle-containing sample solution is put into a pressurized state, and introducing the adjustment beads is started.

Process 7: Stabilization of the feeding of the microparticle-containing sample solution is awaited. For example, the waiting time may be one minute, according to the program. The position of the microparticle sorting microchip is then adjusted (X-axis, Y-axis, and Z-axis) so that the signal intensity of the scattered light or fluorescence from the microparticles is maximized.

Here, light irradiation is performed in the optical system configuration of the microparticle sorting device, and the scattering signals at the laser detection unit and the sorted-out microparticle detection unit shown in FIG. 5 are acquired.

Process 8: The velocity V of each particle is calculated from the passage time difference between the two irradiation portions (the first detection unit and second detection unit) of the laser detection unit in FIG. 5. As an initial value, the sorting operation time T=Y/V depending on the velocity of each particle is calculated, with the actuator drive voltage $D_0$ and the distance Y to the microparticle sorting unit being variables for sweeping.

Note that processes 8 through 13 are a sorting automatic adjustment sequence.

Process 9: The actuator is driven at the sorting operation timing T calculated in process 8.

Process 10: The sorted-out microbeads are detected by a scattered light detection system, for example, and the number of the sorted-out adjustment microbeads is counted.

Process 11: A distance that is any desired proportion of the distance $Y_0$ from the first detection unit to the sorting unit, such as a distance that is 0.2% of the distance $Y_0$ (where $Y_0$ is 1000 µm, Y=2 µm), is searched for in one step, for example.

Processes 9 through 11 are repeated 20 times, for example.

Process 12: On the basis of the data obtained as a result of processes 9 through 11 repeated 20 times, for example, the sorting timing T at which the number of the sorted-out adjustment microbeads is the largest or is the center of the largest value is adopted.

Process 13: Next, the suction force is gradually reduced from the suction force $D_0$ generated by driving of the actuator, and a sorting operation is performed with a 95% suction force that is 5% smaller than the suction force $D_0$, for example. The number of the adjustment microbeads sorted out in that stage is counted by the post-sorting detection unit, and the search is continued until the count after sorting reaches 0.

Note that processes 9 through 13 may be repeated.

Process 14: When the post-sorting counter becomes 0, or when the search is continued until the suction force has reached to the limit at which suctioning cannot be performed, the actuator drive voltage of the step two steps earlier (process 12), which is the suction force D and the sorting timing T, is adopted as the optimum value.

Process 15: Next, the flow rate of feeding of the microparticle-containing sample solution is increased, so that the sample core size is made larger.

Process 16: To make the suction force suitable for the microparticle position calculated by the optical detection system, a coefficient proportional to the microparticle position is set as K, and the actuator drive voltage ($D_2 \div (V/V_{ave})$) is multiplied by the coefficient K.

Process 17: The number of the sorted-out adjustment microbeads is counted.

Steps 16 and 17 may be repeated until all the adjustment microbeads are obtained.

Processes 15 through 17 described above form a suction amount correction sequence.

Process 18: After all the adjustment microbeads are obtained, the feeding of the microparticle-containing sample solution is stopped, and back washing is performed on the line in which the microparticle-containing sample solution has flowed.

The automatic adjustment sequence then comes to an end.

4. Microparticle Sorting Program

The present technology also provides a microparticle sorting program that causes a computer to execute a function of controlling a microparticle sorting device, to implement the method for optimizing microparticle suction conditions.

Specifically, the microparticle sorting program according to the present technology is a program for causing a computer to:

(A) with a microparticle sorting microchip including: a main flow channel in which a sheath solution and a microparticle-containing sample solution flow; and a pressure chamber that sucks microparticles,
acquire data of a velocity V of each microparticle, by introducing the sheath solution and the microparticle-containing sample solution into the main flow channel, and detecting the point of time at which a microparticle passes through a predetermined position in the main flow channel; and (F) acquire data of the average velocity $V_{ave}$ of microparticles during a certain time, and control the suction force of the pressure chamber in inverse proportion to an index calculated by $V/V_{ave}$.

The program may also be a program for causing, between (A) and (F), the computer to:

(B) suck the adjustment microparticles into the pressure chamber from the main flow channel with a predetermined suction force; (C) count the number of the adjustment microparticles sucked into the pressure chamber;

(D) on the basis of the time from the point of time at which the adjustment microparticles pass through the predetermined position in the main flow channel till the suctioning is performed, and the number of the counted adjustment microparticles, determine a time elapsed since the passage through the predetermined position, the suctioning by the microparticle suction channel being to be performed after the elapsed time; and (E) acquire data of the velocity V of each adjustment microparticle, by introducing a larger amount of sample solution than the adjustment-microparticle-containing sample solution into the main flow channel, and detecting the point of time at which the adjustment microparticles pass through the predetermined position in the main flow channel.

The program may be stored in a recording medium such as a magnetic disk, an optical disk, a magneto-optical disk, or a flash memory, or may be distributed via a network, for example. As the program has such a configuration, it is possible to conduct analyses with a computer attached to the microparticle sorting device from outside, or conduct analyses with a computer incorporated into the microparticle sorting device.

5. Microparticle Sorting System

The present technology also provides a microparticle sorting system capable of implementing the method for optimizing microparticle suction conditions.

Specifically, the microparticle sorting system includes:
a microparticle sorting microchip including: a main flow channel in which a sheath solution and a microparticle-containing sample solution flow; and a pressure chamber that sucks microparticles;
a velocity data acquisition device that acquires data of a velocity V of each microparticle, by introducing the sheath solution and the microparticle-containing sample solution into the main flow channel, and detecting the point of time at which a microparticle passes through a predetermined position in the main flow channel;
a pressure control device that controls the pressure for sucking the microparticles, on the basis of the data of the velocity V of each microparticle; and
a computer in which a program for controlling the pressure is installed.

As the computer, a computer in which a program for (A) and (F) is installed, and a computer in which a program for (A), (B), (C), (D), (E), and (F) is installed may be used, for example.

Note that the present technology may also be embodied in the configurations described below.

[1] A method for optimizing microparticle suction conditions, using a microparticle sorting microchip including: a main flow channel in which a sheath solution and a microparticle-containing sample solution flow; and a pressure chamber that sucks microparticles,
the method including:
the step of acquiring data of a velocity V of each microparticle, by introducing the sheath solution and the microparticle-containing sample solution into the main flow channel, and detecting a point of time at which the microparticle passes through a predetermined position in the main flow channel; and
the step of controlling a pressure for sucking the microparticles, on the basis of the data of the velocity V of each microparticle.

[2] The method according to [1], further including the step of acquiring data of at least one of an average velocity $V_{ave}$ of the microparticles during a certain time, or a maximum velocity $V_{max}$ or a minimum velocity $V_{min}$ among the respective microparticles.

[3] The method according to [2], further including the step of controlling the pressure for sucking the microparticles, on the basis of the data of at least one of the average velocity $V_{ave}$ of the microparticles during the certain time, or the maximum velocity $V_{max}$ or the minimum velocity $V_{min}$ among the respective microparticles, and the data of the velocity V of each microparticle.

[4] The method according to [2] or [3], further including the step of controlling the pressure for sucking the microparticles in inverse proportion to an index calculated by $V/V_{ave}$.

[5] The method according to any one of [2] to [4], in which the average velocity $V_{ave}$ is calculated, on the basis of a Hagen-Poiseuille distribution of velocities of the microparticles during the certain time.

[6] The method according to any one of [2] to [5], further including the step of controlling the pressure for sucking the microparticles in inverse proportion to an index calculated by $V/V_{max}$.

[7] The method according to any one of [1] to [6], in which the data of the velocity V of each microparticle is acquired, on the basis of a time t in which a microparticle travels from the predetermined position in the main flow channel to a sorting position.

[8] The method according to any one of [1] to [7], in which the pressure is generated by driving of an actuator in the step of controlling the pressure for sucking the microparticles.

[9] The method according to [7] or [8], in which, when the microparticles flow through a substantially central portion of the microparticle-containing sample solution, the pressure in the pressure chamber with the maximum velocity $V_{max}$ among the respective microparticles at the time t is higher than the pressure with the average velocity $V_{ave}$.

[10] The method according to any one of [7] to [9], in which, when the microparticles pass through a substantially outermost portion of the microparticle-containing sample solution, the pressure in the pressure chamber with the minimum velocity $V_{min}$ among the respective microparticles at the time t is lower than the pressure with the average velocity $V_{ave}$.

[11] The method according to any one of [1] to [10], in which the microparticles include microbeads detectable by light irradiation.

[12] A method for optimizing microparticle suction conditions, the method using a microparticle sorting microchip including: a main flow channel in which a sheath solution and a microparticle-containing sample solution flow; and a pressure chamber that sucks microparticles, the method including:

the step of acquiring data of a velocity V of each adjustment microparticle, by introducing the sheath solution and an adjustment-microparticle-containing sample solution into the main flow channel, and detecting a point of time at which the adjustment microparticle passes through a predetermined position in the main flow channel;

the step of sucking the adjustment microparticles from the main flow channel into the pressure chamber with a predetermined suction force;

the step of counting the number of the adjustment microparticles sucked into the pressure chamber;

the step of determining a time elapsed since passage through the predetermined position, on the basis of a time from the point of time at which the adjustment microparticles passed through the predetermined position in the main flow channel till the suctioning is performed, and the number of the counted adjustment microparticles, the suctioning being to be performed after the elapsed time;

the step of acquiring data of a velocity V of each adjustment microparticle, and an average velocity $V_{ave}$ during a certain time, by introducing a larger amount of sample solution than the adjustment-microparticle-containing sample solution into the main flow channel, and detecting a point of time at which the adjustment microparticle passes through the predetermined position in the main flow channel; and the step of sorting the adjustment microparticles into the pressure chamber, by controlling the pressure in the pressure chamber sucking the adjustment microparticles, in inverse proportion to an index calculated by $V/V_{ave}$.

[13] The method according to [12], further including the step of counting the number of the adjustment microparticles sucked into the pressure chamber, after the step of sorting the adjustment microparticles into the pressure chamber, in which the number of times the adjustment microparticles have been sorted into the pressure chamber is compared with the particle count number of the sorted-out adjustment microparticles, and, when it is determined that not all the adjustment microparticles have been sorted, the pressure in the pressure chamber is made higher and/or smaller, to calculate a constant with which the particle count number of the sorted-out adjustment microparticles becomes substantially the same as the total number of the introduced adjustment microparticles.

[14] A microparticle sorting device including:

a microparticle sorting microchip including: a main flow channel in which a sheath solution and a microparticle-containing sample solution flow; and a pressure chamber that sucks microparticles;

a velocity data acquisition unit that acquires data of a velocity V of each microparticle, by introducing the sheath solution and the microparticle-containing sample solution into the main flow channel, and detecting a point of time at which the microparticle passes through a predetermined position in the main flow channel; and a pressure control unit that controls a pressure for sucking the microparticles, on the basis of the data of the velocity V of each microparticle.

[15] A microparticle sorting system including:

a microparticle sorting microchip including: a main flow channel in which a sheath solution and a microparticle-containing sample solution flow; and a pressure chamber that sucks microparticles;

a velocity data acquisition device that acquires data of a velocity V of each microparticle, by introducing the sheath solution and the microparticle-containing sample solution into the main flow channel, and detecting a point of time at which the microparticle passes through a predetermined position in the main flow channel;

a pressure control device that controls a pressure for sucking the microparticles, on the basis of the data of the velocity V of each microparticle; and a computer in which a program for controlling the pressure is installed.

[16] A microparticle sorting program using a microparticle sorting microchip including: a main flow channel in which a sheath solution and a microparticle-containing sample solution flow; and a pressure chamber that sucks microparticles, the microparticle sorting program causing a computer to:

acquire data of a velocity V of each microparticle by introducing the sheath solution and the microparticle-containing sample solution into the main flow channel, and detecting a point of time at which the microparticle passes through a predetermined position in the main flow channel, and data of an average velocity $V_{ave}$ of the microparticles during a certain time; and control a suction force of the pressure chamber in inverse proportion to an index calculated by $V/V_{ave}$.

[17] A microparticle sorting program using a microparticle sorting microchip including: a main flow channel in which a sheath solution and a microparticle-containing sample solution flow; and a pressure chamber that sucks microparticles, the microparticle sorting program causing a computer to:

acquire data of an adjustment microparticle velocity, by introducing the sheath solution and an adjustment-microparticle-containing sample solution into the main flow channel, and detecting a point of time at which the adjustment microparticle passes through a predetermined position in the main flow channel;

suck the adjustment microparticles from the main flow channel into the pressure chamber with a predetermined suction force generated from the pressure chamber;

count the number of the adjustment microparticles sucked into the pressure chamber;

determine a time elapsed since passage through the predetermined position, on the basis of a time from the point of time at which the adjustment microparticle passed through the predetermined position in the main flow channel till the suctioning is performed, and the number of the counted adjustment microparticles, the suctioning being to be performed after the elapsed time;

acquire data of a velocity V of each adjustment microparticle, and an average velocity $V_{ave}$ of the adjustment microparticles during a certain time, by introducing a larger amount of sample solution than the adjustment-microparticle-containing sample solution into the main flow channel, and detecting a point of time at which the adjustment microparticle passes through the predetermined position in the main flow channel; and sort the adjustment microparticles into the pressure chamber, by controlling the suction force of the pressure chamber, in inverse proportion to an index calculated by $V/V_{ave}$.

REFERENCE SIGNS LIST

100 Microchip
101 Sample solution inlet
102 Sample solution channel
103 Sheath solution inlet
104 Sheath solution channel
105 Main flow channel
106 Detection region
107 Sorting unit
108 Branch flow channel (waste flow channel)
109 Particle sorting channel
110 Branch flow channel end
111 Sorting flow channel end
112 Gate flow inlet
201 Orifice portion
202 Light irradiation region
601 Region in which microparticles are sucked into the microparticle suction channel in a case where suctioning is performed with a suction force $D_0$ 602 Microparticle
801 Region in which microparticles are sucked into the microparticle suction channel in a case where suctioning is performed with a suction force $D_n$ 802 Microparticle
901 Region in which microparticles are sucked into the microparticle suction channel in a case where suctioning is performed with a suction force $D_z$

The invention claimed is:

1. A method for optimizing microparticle suction conditions, the method using a microparticle sorting microchip including: a main flow channel in which a sheath solution and a microparticle-containing sample solution flow; and a pressure chamber that sucks microparticles, the method comprising:

a step of acquiring data of a velocity V of each adjustment microparticle, by introducing the sheath solution and an adjustment-microparticle-containing sample solution into the main flow channel, and detecting a point of time at which the adjustment microparticle passes through a predetermined position in the main flow channel;

a step of sucking the adjustment microparticles from the main flow channel into the pressure chamber with a predetermined suction force;

a step of counting the number of the adjustment microparticles sucked into the pressure chamber;

a step of determining a time elapsed since passage through the predetermined position, on a basis of a time from the point of time at which the adjustment microparticle passed through the predetermined position in the main flow channel till the suctioning is performed, and the number of the counted adjustment microparticles, the suctioning being to be performed after the elapsed time;

a step of acquiring data of a velocity V of each adjustment microparticle, and an average velocity $V_{ave}$ during a certain time, by introducing a larger amount of sample solution than the adjustment-microparticle-containing sample solution into the main flow channel, and detecting a point of time at which the adjustment microparticle passes through the predetermined position in the main flow channel; and a step of sorting the adjustment microparticles into the pressure chamber, by controlling the pressure in the pressure chamber sucking the adjustment microparticles, in inverse proportion to an index calculated by $V/V_{ave}$.

2. The method according to claim 1, further comprising a step of counting the number of the adjustment microparticles sucked into the pressure chamber, after the step of sorting the adjustment microparticles into the pressure chamber, wherein the number of times the adjustment microparticle have been sorted into the pressure chamber is compared with the particle count number of the sorted-out adjustment microparticles, and, when it is determined that not all the adjustment microparticles have been sorted, the pressure in the pressure chamber is made higher and/or smaller, to calculate a constant with which the particle count number of the sorted-out adjustment microparticles becomes substantially the same as the total number of the introduced adjustment microparticles.

3. A non-transitory computer readable storage medium storing a microparticle sorting program using a microparticle sorting microchip including: a main flow channel in which a sheath solution and a microparticle-containing sample solution flow; and a pressure chamber that sucks microparticles, the microparticle sorting program causing a computer to:
acquire data of an adjustment microparticle velocity, by introducing the sheath solution and an adjustment-microparticle-containing sample solution into the main flow channel, and detecting a point of time at which the adjustment microparticle passes through a predetermined position in the main flow channel;

suck the adjustment microparticles from the main flow channel into the pressure chamber with a predetermined suction force generated from the pressure chamber;

count the number of the adjustment microparticles sucked into the pressure chamber;

determine a time elapsed since passage through the predetermined position, on a basis of a time from the point of time at which the adjustment microparticle passed through the predetermined position in the main flow channel till the suctioning is performed, and the number of the counted adjustment microparticles, the suctioning being to be performed after the elapsed time;

acquire data of a velocity V of each adjustment microparticle, and an average velocity $V_{ave}$ of the adjustment microparticles during a certain time, by introducing a larger amount of sample solution than the adjustment-microparticle-containing sample solution into the main flow channel, and detecting a point of time at which the adjustment microparticle passes through the predetermined position in the main flow channel; and sort the adjustment microparticles into the pressure chamber, by controlling the suction force of the pressure chamber, in inverse proportion to an index calculated by $V/V_{ave}$.

* * * * *